United States Patent
Chen et al.

(10) Patent No.: US 11,677,860 B2
(45) Date of Patent: Jun. 13, 2023

(54) DECENTRALIZATION PROCESSING METHOD, COMMUNICATION PROXY, HOST, AND STORAGE MEDIUM

(71) Applicant: HUAWEI TECHNOLOGIES CO., LTD., Guangdong (CN)

(72) Inventors: Xiao Chen, Shenzhen (CN); Long Li, Shenzhen (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 2 days.

(21) Appl. No.: 17/554,724

(22) Filed: Dec. 17, 2021

(65) Prior Publication Data
US 2022/0109741 A1 Apr. 7, 2022

Related U.S. Application Data

(63) Continuation of application No. PCT/CN2020/096846, filed on Jun. 18, 2020.

(30) Foreign Application Priority Data

Jun. 18, 2019 (CN) .......................... 201910527161.9

(51) Int. Cl.
*H04L 67/63* (2022.01)
*H04L 47/20* (2022.01)
(Continued)

(52) U.S. Cl.
CPC .............. *H04L 67/63* (2022.05); *H04L 47/20* (2013.01); *H04L 67/1014* (2013.01); *H04L 67/567* (2022.05)

(58) Field of Classification Search
CPC ... H04L 67/63; H04L 67/567; H04L 67/1014; H04L 47/20
See application file for complete search history.

(56) References Cited

U.S. PATENT DOCUMENTS 10,136,296 B1 11/2018 Dames et al.
10,158,672 B2* 12/2018 Shieh .................. H04L 63/1408
(Continued)

FOREIGN PATENT DOCUMENTS

CN 106656630 A 5/2017
CN 107181815 A 9/2017
(Continued)

OTHER PUBLICATIONS

Anonymous: "Istioldie 1.0 / Traffic Management in Istio 1.0",, Mar. 19, 2019 (Mar. 19, 2019), XP055727807, 14 pages.
(Continued)

*Primary Examiner* — Dhairya A Patel
(74) *Attorney, Agent, or Firm* — Womble Bond Dickinson (US) LLP

(57) ABSTRACT

This application discloses a decentralization processing method, which are applied to a microservice system. A first communication proxy in the microservice system receives a first microservice request sent by a first microservice application, the first communication proxy determines, based on a target control plane rule, a microservice access address corresponding to the first microservice request, and sends the first microservice request to the second communication proxy having the microservice access address, where the second communication proxy is used to forward the first microservice request to the second microservice application. The first communication proxy can send the microservice request to the corresponding second communication proxy, and a control plane does not need to route the microservice request, so that traffic for routing the microservice request by the control plane is effectively reduced, and impact of a burst of microservice requests on the control plane is effectively avoided.

16 Claims, 10 Drawing Sheets

(51) Int. Cl.
*H04L 67/1014* (2022.01)
*H04L 67/567* (2022.01)

(56) References Cited

U.S. PATENT DOCUMENTS

| | | | |
|---|---|---|---|
| 10,574,736 B2 * | 2/2020 | Kulp | H04L 67/10 |
| 10,764,244 B1 * | 9/2020 | Mestery | H04L 61/2592 |
| 10,827,020 B1 * | 11/2020 | Cao | H04L 67/561 |
| 2018/0198845 A1 | 7/2018 | Kulp et al. | |
| 2019/0020665 A1 | 1/2019 | Surcouf et al. | |
| 2019/0098106 A1 * | 3/2019 | Mungel | H04L 67/02 |
| 2019/0319885 A1 * | 10/2019 | Fan | H04L 67/60 |
| 2020/0127980 A1 * | 4/2020 | Smith | H04L 63/06 |
| 2020/0220848 A1 * | 7/2020 | Patwardhan | H04L 63/0281 |
| 2020/0322444 A1 * | 10/2020 | Stefanko | H04L 67/55 |
| 2020/0336553 A1 * | 10/2020 | Yeddula | H04L 45/306 |
| 2021/0135983 A1 * | 5/2021 | Farnham | H04L 45/70 |

FOREIGN PATENT DOCUMENTS

| | | |
|---|---|---|
| CN | 107766205 A | 3/2018 |
| CN | 108206852 A | 6/2018 |
| CN | 108712464 A | 10/2018 |
| CN | 108881121 A | 11/2018 |
| CN | 109246246 A | 1/2019 |
| CN | 110401696 A | 11/2019 |

OTHER PUBLICATIONS

Anonymous: "Istioldie 1.0 / Policies and Telemetry",, Mar. 19, 2019 (Mar. 19, 2019), pp. 1-6, XP055923789, 6 pages.

* cited by examiner

DECENTRALIZATION PROCESSING METHOD, COMMUNICATION PROXY, HOST, AND STORAGE MEDIUM

CROSS-REFERENCE TO RELATED APPLICATIONS

This application is a continuation of International Application No. PCT/CN2020/096846, filed on Jun. 18, 2020, which claims priority to Chinese Patent Application No. 201910527161.9, filed on Jun. 18, 2019. The disclosures of the aforementioned applications are hereby incorporated by reference in their entireties.

TECHNICAL FIELD

This application relates to the computer field, and in particular, to a decentralization processing method, a communication proxy, a host, and a storage medium.

BACKGROUND

With rapid development of microservices and cloudification technologies, a large quantity of microservices make operation and maintenance of the microservices more difficult, such as connection, management, and monitoring of the microservices. Therefore, a dedicated microservice system such as a service mesh is usually needed to perform communication, current limiting, fusing, monitoring, and the like between services.

The microservice system includes a control plane and a data plane, and the control plane may be used to process a microservice request sent by a sidecar of the data plane. Service mesh open source software, such as Istio for example, shown in FIG. 1 is used as an example, and that a control plane includes a mixer is used as an example. The mixer is used to carry a communication bridge between a sidecar and a back-end infrastructure and a communication bridge between different sidecars. When the mixer receives a microservice request sent by a sidecar, if the mixer determines, based on the microservice request, that the microservice request is a request for a back-end infrastructure, the mixer sends the microservice request to the corresponding back-end infrastructure. If the mixer determines, based on the microservice request, that the microservice request is a request for a sidecar, the mixer sends the microservice request to the corresponding sidecar.

When a large quantity of sidecars send a large quantity of microservice requests to the control plane, the large quantity of microservice requests very likely cause burst traffic to the control plane. Consequently, the control plane becomes faulty due to the burst traffic. Once the control plane becomes faulty, the faulty control plane cannot process the large quantity of microservice requests sent by the sidecars, causing fault diffusion.

SUMMARY

This application provides a decentralization processing method, a communication proxy, a host, and a storage medium, to reduce impact of burst traffic on a control plane.

A first aspect of embodiments of the present invention provides a decentralization processing method, applied to a microservice system. The method includes:

A first communication proxy in the microservice system receives a first microservice request sent by a first microservice application, where the first microservice application is a microservice application corresponding to the first communication proxy. The first communication proxy determines, based on a target control plane rule, a microservice access address corresponding to the first microservice request, where the target control plane rule includes a routing rule policy, and the routing rule policy includes a correspondence between the first microservice request and the microservice access address. The microservice access address is an address of a second communication proxy, the second communication proxy corresponds to a second microservice application, and a microservice service supported by the second microservice application is the same as a microservice service requested by the first microservice request. The first communication proxy sends the first microservice request to the second communication proxy having the microservice access address, where the second communication proxy is used to forward the first microservice request to the second microservice application.

According to the method shown in this aspect, because the target control plane rule of a control plane may be configured on the communication proxy of a data plane, pressure on resources of the control plane that are used to execute a policy configured on the communication proxy is relieved, and consumption of control plane resources is reduced. In addition, because the target control plane is configured on the communication proxy, the communication proxy may perform a function of the target control plane based on the configuration. This reduces traffic of information sent by the communication proxy to the control plane, reduces impact of a burst of the traffic sent by the communication proxy to the control plane on the control plane, and effectively prevents service provisioning and operation and maintenance from being affected by diffusion of an unknown fault (such as a silent fault) on the control plane.

In an optional embodiment of the first aspect of the embodiments of the present invention, the method further includes: There are a plurality of first microservice requests and a plurality of microservice access addresses, the target control plane rule further includes a traffic splitting policy corresponding to the first microservice requests, and the traffic splitting policy is used to indicate a proportion of first microservice requests to be sent to each microservice access address. That the first communication proxy sends the first microservice request to the second communication proxy having the microservice access address includes: The first communication proxy sends the plurality of first microservice requests to each microservice access address based on the traffic splitting policy.

The traffic splitting policy is used to indicate a quantity of first microservice requests to be sent to each microservice access address. The traffic splitting policy includes a correspondence between each second microservice application in a plurality of second microservice applications and a split proportion. The first microservice application sends a plurality of microservice requests to the first communication proxy, and the plurality of microservice requests are used to request a same target microservice service. The plurality of second microservice applications are all used to implement the target microservice service. Because the traffic splitting policy is configured on the communication proxy, consumption of resources of the control plane that are used to execute the traffic splitting policy is reduced.

In an optional embodiment of the first aspect of the embodiments of the present invention, the method further includes: There are a plurality of microservice access addresses corresponding to the same first microservice request, and the target control plane rule further includes a load balancing policy corresponding to the first microservice request. That the first communication proxy sends the first microservice request to the second communication proxy having the microservice access address includes: The first communication proxy determines a target microservice access address from the plurality of microservice access addresses based on the load balancing policy, and sends the first microservice request to the second communication proxy having the target microservice access address.

The first communication proxy configured with the load balancing policy may select a target second microservice application from the plurality of second microservice applications for processing, and process the first microservice request only by using the selected target second microservice application. Because the load balancing policy is configured on the communication proxy, consumption of resources of the control plane that are used to execute the load balancing policy is reduced.

In an optional embodiment of the first aspect of the embodiments of the present invention, the method further includes: The target control plane rule further includes a circuit breaker policy used to indicate preset response duration. After the first communication proxy sends the first microservice request to the second communication proxy having the microservice access address, the method further includes: If the first communication proxy determines a condition that a successful response message sent by the second communication proxy is not received within the preset response duration, the first communication proxy sends the first microservice request to a third communication proxy. The successful response message is used to indicate that the second communication proxy successfully receives the first microservice request, the third communication proxy is used to forward the first microservice request to a third microservice application corresponding to the third communication proxy, and a microservice service supported by the third microservice application is the same as the microservice service requested by the first microservice request.

For the first communication proxy configured with the circuit breaker policy, if the first communication proxy receives a first microservice request sent by the first microservice application, and the first communication proxy determines that the first microservice request needs to be sent to a second microservice application, the first communication proxy may determine whether a successful response message sent by the second microservice application is received within the preset response duration indicated by the circuit breaker policy. Because the circuit breaker policy is configured on the communication proxy, consumption of resources of the control plane that are used to execute the circuit breaker policy is reduced.

In an optional embodiment of the first aspect of the embodiments of the present invention, the method further includes: The target control plane rule further includes a data reporting policy corresponding to the first microservice request, and the data reporting policy is used to connect to a back-end infrastructure. After the first communication proxy receives the first microservice request sent by the first microservice application, the method further includes: The first communication proxy sends the first microservice request to the back-end infrastructure based on the data reporting policy, where the back-end infrastructure is used to monitor the received first microservice request.

For the first communication proxy configured with the data reporting policy, if the data reporting policy corresponds to the first microservice request, when the first communication proxy receives the first microservice request, the first communication proxy may report the first microservice request to the back-end infrastructure. If the data reporting policy corresponds to the second microservice request, when the first communication proxy receives the second microservice request, the first communication proxy may report the second microservice request to the back-end infrastructure. Because the data reporting policy is configured on the communication proxy, consumption of resources of the control plane that are used to execute the data reporting policy is reduced.

In an optional embodiment of the first aspect of the embodiments of the present invention, the method further includes: The first communication proxy receives a second microservice request, where a microservice service requested by the second microservice request is the same as a microservice service supported by the first microservice application. If the first communication proxy determines a condition that verification information included in the second microservice request is the same as preset verification information, the first communication proxy forwards the second microservice request to the first microservice application.

In an optional embodiment of the first aspect of the embodiments of the present invention, the method further includes: The target control plane rule further includes a quota management policy corresponding to the second microservice request, and the quota management policy is used to indicate a preset connection quantity. That the first communication proxy forwards the second microservice request to the first microservice application includes: The first communication proxy obtains a target connection quantity, where the target connection quantity is a quantity of second microservice requests currently being processed by the first microservice application; and if the first communication proxy determines a condition that the target connection quantity is less than the preset connection quantity, the first communication proxy sends the second microservice request to the first microservice application.

In an optional embodiment of the first aspect of the embodiments of the present invention, the method further includes: The first communication proxy obtains first configuration information stored in the first communication proxy. The first communication proxy receives second configuration information sent by at least one target communication proxy, where the target communication proxy is a communication proxy that is in the microservice system and that is different from the first communication proxy, and at least one of the first configuration information and the at least one piece of second configuration information includes a correspondence between an identifier of the first communication proxy and a control plane rule. The first communication proxy determines the target control plane rule based on the first configuration information and the at least one piece of second configuration information, where the target control plane rule is a control plane rule corresponding to the identifier of the first communication proxy.

According to the method shown in this aspect, when at least one of the first configuration information and the second configuration information is used to indicate a rule related to at least one function of the control plane, the rule related to the at least one function of the control plane may be configured on a communication proxy included in a service mesh based on the first configuration information and the second configuration information. Therefore, pressure on resources of the control plane that are used to perform the function configured on the communication proxy is relieved, and consumption of control plane resources is reduced. In addition, because the rule related to the at least one function of the control plane is configured on the communication proxy, the communication proxy may perform the at least one function of the control plane based on the configuration. This reduces traffic sent by the communication proxy to the control plane, reduces impact of a burst of the traffic sent by the communication proxy to the control plane on the control plane, and effectively avoids service interruption. The service mesh is not suspended due to high traffic on the data plane. In addition, service provisioning and operation and maintenance are effectively prevented from being affected by diffusion of an unknown fault (such as a silent fault) on the control plane in the service mesh. In addition, according to the method shown in this embodiment, any communication proxy in the service mesh can obtain a rule configured on each communication proxy in the service mesh, thereby implementing global consistency of the service mesh, and improving efficiency of rule configuration for the communication proxy.

In an optional embodiment of the first aspect of the embodiments of the present invention, the method further includes: The first communication proxy obtains a stored first node list. The first communication proxy receives a second node list from the at least one target communication proxy, where at least one of the first node list and the at least one second node list includes an identifier of each communication proxy in the microservice system. The first communication proxy determines updated first configuration information based on the first node list and the second node list, where the updated first configuration information includes a correspondence between the identifier of each communication proxy in the microservice system and a control plane rule.

According to the method shown in this aspect, to implement the global consistency of the service mesh, the communication proxy updates, based on the locally stored first node list and the second node list sent by the second communication proxy, a target correspondence stored in the communication proxy, to improve accuracy and efficiency of the global consistency of the service mesh.

In an optional embodiment of the first aspect of the embodiments of the present invention, that the first communication proxy determines updated first configuration information based on the first node list and the second node list includes: The first communication proxy determines a first target communication proxy, where the first node list includes an identifier of the first target communication proxy, and the second node list does not include the identifier of the first target communication proxy. The first communication proxy determines the updated first configuration information based on the first target communication proxy, where the updated first configuration information is information generated after a correspondence between the identifier of the first target communication proxy and a control plane rule is deleted from the first configuration information.

The first communication proxy determines the first target communication proxy based on the first node list and the second node list. The first target communication proxy means that the identifier of the first target communication proxy is set in the first node list, and the identifier of the first target communication proxy is not set in the second node list. In this case, it indicates that for the first communication proxy, the first target communication proxy in the service mesh has exited the service mesh. To implement the global consistency of the service mesh, the first communication proxy deletes, from the locally stored target correspondence, the correspondence between the identifier of the first target communication proxy and the control plane rule.

In an optional embodiment of the first aspect of the embodiments of the present invention, that the first communication proxy determines updated first configuration information based on the first node list and the second node list includes: The first communication proxy determines a second target communication proxy, where the first node list does not include an identifier of the second target communication proxy, and the second node list includes the identifier of the first target communication proxy. The first communication proxy determines the updated first configuration information based on the second target communication proxy, where the updated first configuration information is information generated after a correspondence between the identifier of the second target communication proxy and a control plane rule is added to the first configuration information.

The first communication proxy determines the second target communication proxy based on the first node list and the second node list. The second target communication proxy means that the identifier of the second target communication proxy is not set in the first node list, and the identifier of the second target communication proxy is set in the second node list. In this case, it indicates that for the first communication proxy, a new communication proxy, that is, the second target communication proxy, is added to the service mesh in which the first communication proxy is located. To implement the global consistency of the service mesh, the first communication proxy adds the correspondence between the identifier of the second target communication proxy and the control plane rule to the locally stored target correspondence.

In an optional embodiment of the first aspect of the embodiments of the present invention, that the first communication proxy determines updated first configuration information based on the first node list and the second node list includes: The first communication proxy determines a third target communication proxy, where both the first node list and the second node list include an identifier of the third target communication proxy. If the first communication proxy determines a condition that a version identifier of a first correspondence is later than a version identifier of a second correspondence, the first communication proxy determines that the updated first configuration information includes the first correspondence, where the first correspondence is a correspondence that is between the identifier of the third target communication proxy and a control plane rule and that is included in the first configuration information, and the second correspondence is a correspondence that is between the identifier of the third target communication proxy and a control plane rule and that is included in the second configuration information. If the first communication proxy determines a condition that the version identifier of the second correspondence is later than the version identifier of the first correspondence, the first communication proxy determines that the updated first configuration information includes the second correspondence.

The first communication proxy determines the third target communication proxy based on the first node list and the second node list. The third target communication proxy means that both the first node list and the second node list include the identifier of the third target communication proxy. In this case, it indicates that both the target correspondence stored in the first communication proxy and a target correspondence stored in the target communication proxy include the correspondence between the identifier of the third target communication proxy and the control plane rule.

A second aspect of the embodiments of the present invention provides a communication proxy. The communication proxy is a first communication proxy in a microservice system, and the communication proxy includes:

a receiving unit, configured to receive a first microservice request sent by a first microservice application, where the first microservice application is a microservice application corresponding to the first communication proxy;

a determining unit, configured to determine, based on a target control plane rule, a microservice access address corresponding to the first microservice request, where the target control plane rule includes a routing rule policy, and the routing rule policy includes a correspondence between the first microservice request and the microservice access address; the microservice access address is an address of a second communication proxy, the second communication proxy corresponds to a second microservice application, and a microservice service supported by the second microservice application is the same as a microservice service requested by the first microservice request; and a sending unit, configured to send the first microservice request to the second communication proxy having the microservice access address, where the second communication proxy is used to forward the first microservice request to the second microservice application.

In an optional embodiment of the second aspect of the embodiments of the present invention, there are a plurality of first microservice requests and a plurality of microservice access addresses, the target control plane rule further includes a traffic splitting policy corresponding to the first microservice requests, and the traffic splitting policy is used to indicate a proportion of first microservice requests to be sent to each microservice access address. The sending unit is specifically configured to send the plurality of first microservice requests to each microservice access address based on the traffic splitting policy.

In an optional embodiment of the second aspect of the embodiments of the present invention, there are a plurality of microservice access addresses corresponding to the same first microservice request, and the target control plane rule further includes a load balancing policy corresponding to the first microservice request. The sending unit is specifically configured to determine a target microservice access address from the plurality of microservice access addresses based on the load balancing policy, and send the first microservice request to the second communication proxy having the target microservice access address.

In an optional embodiment of the second aspect of the embodiments of the present invention, the target control plane rule further includes preset response duration. The sending unit is further configured to: if determining a condition that a successful response message sent by the second communication proxy is not received within the preset response duration, send the first microservice request to a third communication proxy, where the successful response message is used to indicate that the second communication proxy successfully receives the first microservice request, the third communication proxy is used to forward the first microservice request to a third microservice application corresponding to the third communication proxy, and a microservice service supported by the third microservice application is the same as the microservice service requested by the first microservice request.

In an optional embodiment of the second aspect of the embodiments of the present invention, the target control plane rule further includes a data reporting policy corresponding to the first microservice request, and the data reporting policy is used to connect to a back-end infrastructure. The sending unit is further configured to send the first microservice request to the back-end infrastructure based on the data reporting policy, where the back-end infrastructure is used to monitor the received first microservice request.

In an optional embodiment of the second aspect of the embodiments of the present invention, the receiving unit is further configured to receive a second microservice request, where a microservice service requested by the second microservice request is the same as a microservice service supported by the first microservice application. The sending unit is further configured to: if determining a condition that verification information included in the second microservice request is the same as preset verification information, forward the second microservice request to the first microservice application.

In an optional embodiment of the second aspect of the embodiments of the present invention, the target control plane rule further includes a quota management policy corresponding to the second microservice request, and the quota management policy is used to indicate a preset connection quantity. The sending unit is further configured to: obtain a target connection quantity, where the target connection quantity is a quantity of second microservice requests currently being processed by the first microservice application; and if determining a condition that the target connection quantity is less than the preset connection quantity, send the second microservice request to the first microservice application.

In an optional embodiment of the second aspect of the embodiments of the present invention, the receiving unit is further configured to obtain first configuration information stored in the first communication proxy. The receiving unit is further configured to receive second configuration information sent by at least one target communication proxy, where the target communication proxy is a communication proxy that is in the microservice system and that is different from the first communication proxy, and at least one of the first configuration information and the at least one piece of second configuration information includes a correspondence between an identifier of the first communication proxy and a control plane rule. The determining unit is further configured to determine the target control plane rule based on the first configuration information and the at least one piece of second configuration information, where the target control plane rule is a control plane rule corresponding to the identifier of the first communication proxy.

In an optional embodiment of the second aspect of the embodiments of the present invention, the receiving unit is further configured to obtain a stored first node list. The receiving unit is further configured to receive a second node list from the at least one target communication proxy, where at least one of the first node list and the at least one second node list includes an identifier of each communication proxy in the microservice system. The determining unit is further configured to determine updated first configuration information based on the first node list and the second node list, where the updated first configuration information includes a correspondence between the identifier of each communication proxy in the microservice system and a control plane rule.

In an optional embodiment of the second aspect of the embodiments of the present invention, the determining unit includes: a first determining module, configured to determine a first target communication proxy, where the first node list includes an identifier of the first target communication proxy, and the second node list does not include the identifier of the first target communication proxy; and a second determining module, configured to determine the updated first configuration information based on the first target communication proxy, where the updated first configuration information is information generated after a correspondence between the identifier of the first target communication proxy and a control plane rule is deleted from the first configuration information.

In an optional embodiment of the second aspect of the embodiments of the present invention, the determining unit includes: a third determining module, configured to determine a second target communication proxy, where the first node list does not include an identifier of the second target communication proxy, and the second node list includes the identifier of the first target communication proxy; and a fourth determining module, configured to determine the updated first configuration information based on the second target communication proxy, where the updated first configuration information is information generated after a correspondence between the identifier of the second target communication proxy and a control plane rule is added to the first configuration information.

In an optional embodiment of the second aspect of the embodiments of the present invention, the determining unit includes: a fifth determining module, configured to determine a third target communication proxy, where both the first node list and the second node list include an identifier of the third target communication proxy; a sixth determining module, configured to: if determining a condition that a version identifier of a first correspondence is later than a version identifier of a second correspondence, determine that the updated first configuration information includes the first correspondence, where the first correspondence is a correspondence that is between the identifier of the third target communication proxy and a control plane rule and that is included in the first configuration information, and the second correspondence is a correspondence that is between the identifier of the third target communication proxy and a control plane rule and that is included in the second configuration information; and a seventh determining module, configured to: if determining a condition that the version identifier of the second correspondence is later than the version identifier of the first correspondence, determine that the updated first configuration information includes the second correspondence.

A third aspect of the embodiments of the present invention provides a host, including a processor and a memory. The memory stores a first computer-readable program and a second computer-readable program. The processor runs the first computer-readable program in the memory, to perform a function of a microservice application used to provide a microservice service. The processor runs the second computer-readable program in the memory, to complete the method shown in any embodiment of the first aspect of the embodiments of the present invention.

A fourth aspect of the embodiments of the present invention provides a computer program product. When the computer product is executed, the computer program product is configured to perform the method shown in any embodiment of the first aspect of the embodiments of the present invention.

A fifth aspect of the embodiments of the present invention provides a computer-readable storage medium. The computer-readable storage medium stores instructions, and the instructions are used to perform the method shown in any embodiment of the first aspect of the embodiments of the present invention.

DESCRIPTION OF EMBODIMENTS

The following clearly and completely describes the technical solutions in the embodiments of the present invention with reference to the accompanying drawings in the embodiments of the present invention. It is clearly that the described embodiments are merely some rather than all of the embodiments of the present invention. All other embodiments obtained by a person skilled in the art based on the embodiments of the present invention without creative efforts shall fall within the protection scope of the present invention.

The term "and/or" in this application describes only an association relationship for describing associated objects and represents that three relationships may exist. For example, A and/or B may represent the following three cases: Only A exists, both A and B exist, and only B exists. In addition, the character "/" in this application generally indicates an "or" relationship between the associated objects.

In the specification, claims, and accompanying drawings of this application, the terms such as "first" and "second" are intended to distinguish between similar objects but do not necessarily indicate a specific order or sequence. It should be understood that the data termed in such a way are interchangeable in proper circumstances so that the embodiments of the present invention described herein can be implemented in other orders than the order illustrated or described herein. Moreover, the terms "include", "contain", and any other variants mean to cover the non-exclusive inclusion, for example, a process, method, system, product, or device that includes a list of steps or modules is not necessarily limited to those steps or modules, but may include other steps or modules not expressly listed or inherent to such a process, method, system, product, or device.

To better understand a decentralization processing method provided in the present invention, the following first describes a microservice:

A complex system is divided into dozens or even hundreds of small services, and each microservice is responsible for implementing independent service logic. These microservices are easy to understand and modify, provide flexibility in language and framework selection, shorten an application development and go-online time, support independent expansion of services based on different workloads and resource requirements, and have other advantages.

Figure 1:
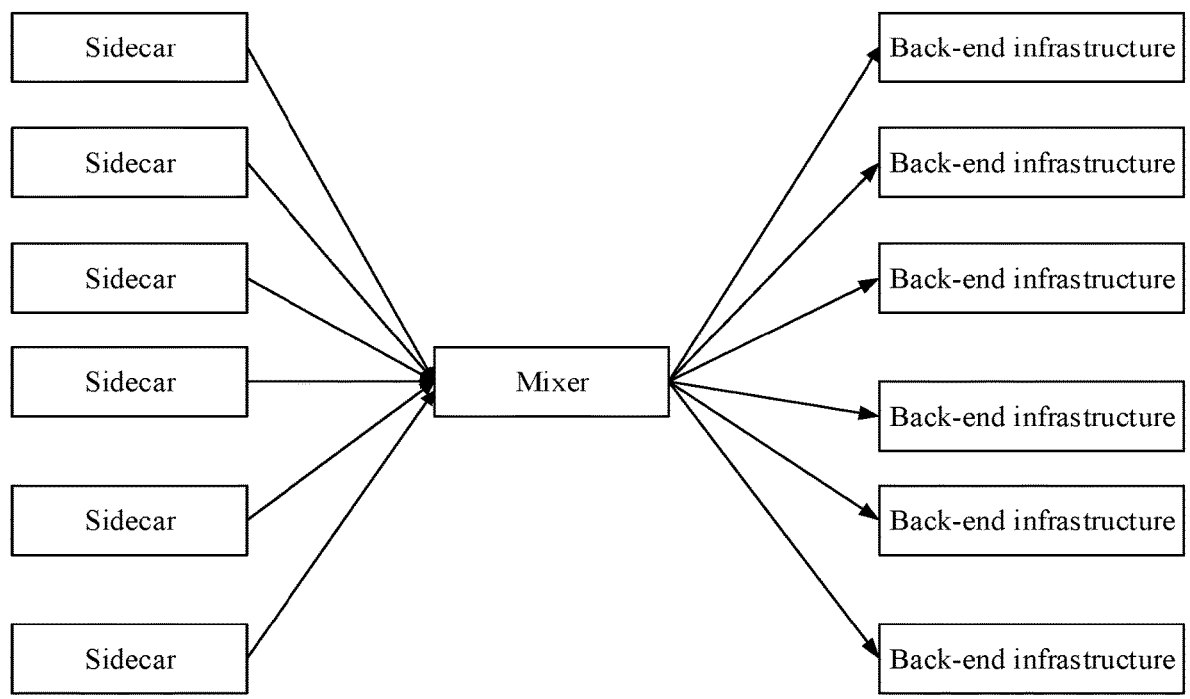
FIG. 1 is a schematic diagram of an example structure of a microservice system according to a conventional technology.
Figure 2:
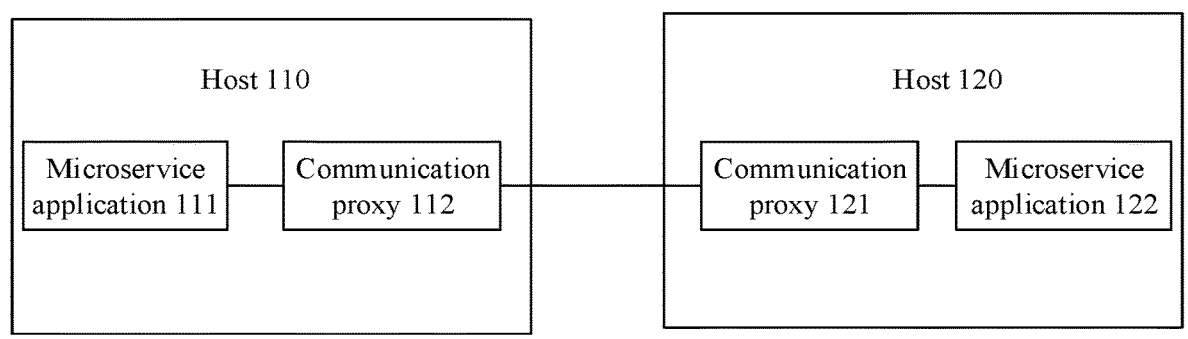
FIG. 2 is another schematic diagram of an example structure of a microservice system according to the conventional technology.

Based on different service requirements, a developer may develop microservice systems for implementing different services, for example, a microservice system for implementing a shopping service and a microservice system for implementing a flight booking service. With reference to FIG. 2, the following describes an example of a specific structure of a microservice system. A service type implemented by the microservice system is not limited in the example shown in FIG. 2.

The microservice system includes a plurality of hosts, and the hosts may be physical machines or virtual machines. The host includes one or more microservice applications. Each microservice application may be understood as the microservice shown above, which is responsible for independent service logic of the microservice system. The host further includes a communication proxy corresponding to each microservice application. Different microservice applications included in the microservice system are used to implement different microservice services. For example, if a service implemented by the microservice system is a flight booking service, microservice services that may be implemented by different microservice applications in the microservice system are a flight schedule query microservice service, a fare calculation microservice service, an order booking microservice service, a seat allocation microservice service, a customer information query microservice service, and the like. A communication proxy corresponding to a microservice application is used for communication between the microservice application and another microservice application included in the microservice system.

As shown in FIG. 2, a structure of a microservice system is specifically described. As shown in FIG. 2, an example in which the microservice system includes a host 110 and a host 120 is used for description. A microservice application 111 and a communication proxy 112 corresponding to the microservice application 111 are disposed on the host 110. A microservice application 122 and a communication proxy 121 corresponding to the microservice application 122 are disposed on the host 120. As shown in FIG. 2, microservice services implemented by the microservice application 111 and the microservice application 122 are not limited. For example, different microservice applications located in the microservice system need to perform data exchange. For example, if a microservice service implemented by the microservice application 111 on the host 110 is a fare calculation microservice service, and a microservice service implemented by the microservice application 122 on the host 120 is an order booking microservice service, after the microservice application 111 implements the fare calculation microservice service based on order information entered by a user, the microservice application 111 needs to send related order information to the microservice application 122, so that the microservice application 122 implements the order booking microservice service based on a fare, the order information, and the like, and the user implements plane ticket booking based on the microservice system.

To implement data exchange between the microservice application 111 and the microservice application 122, the microservice application 111 first sends, to the communication proxy 112, data that needs to be sent to the microservice application 122, and then the communication proxy 112 forwards the data to the communication proxy 121 corresponding to the microservice application 122. Finally, the communication proxy 121 forwards the data to the microservice application 122. It may be learned that data exchange between different microservice applications is implemented by using communication proxies corresponding to the different microservice applications to forward data.

Figure 3:
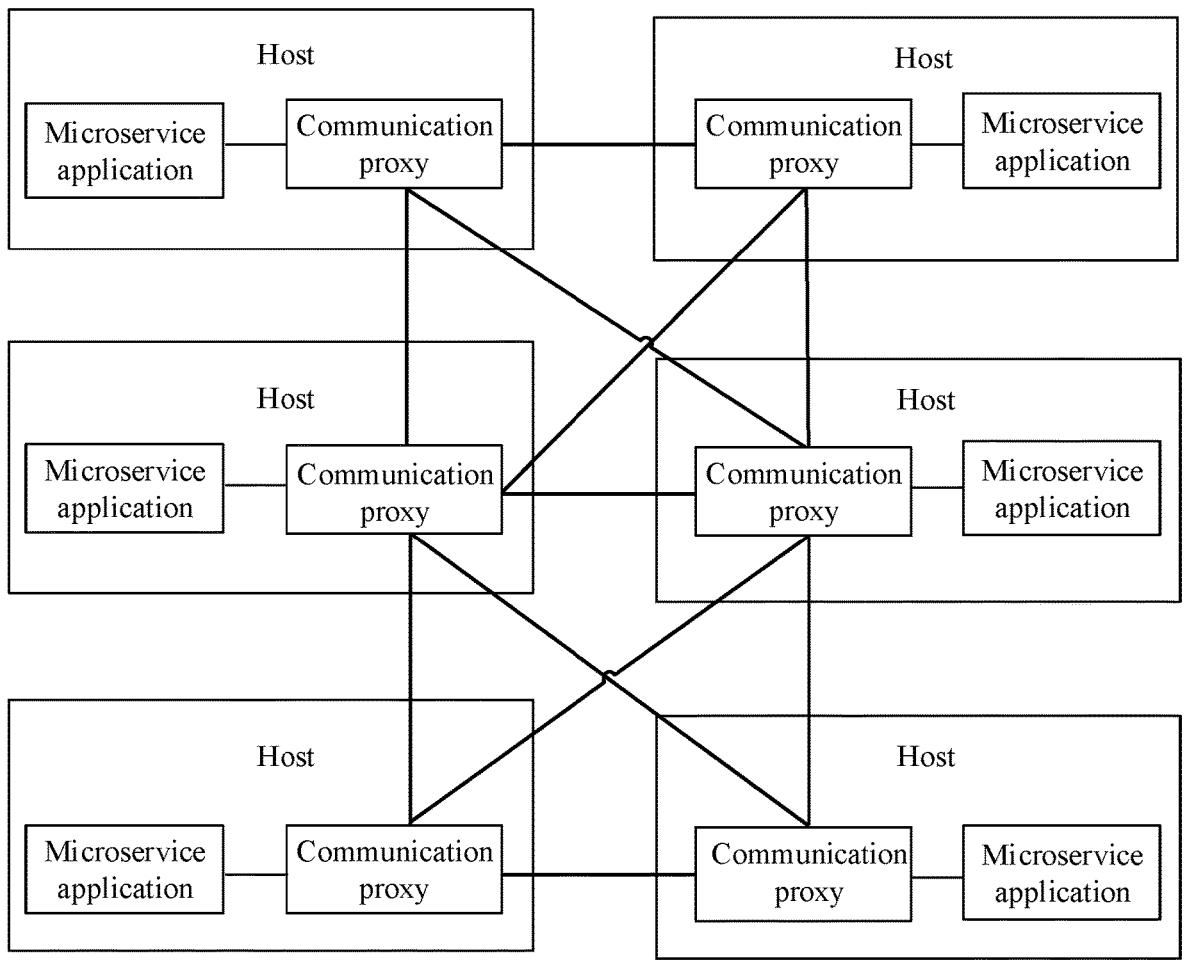
FIG. 3 is a schematic diagram of a structure of an embodiment of a microservice system according to an embodiment of the present invention.

When a large quantity of microservice applications implementing different microservice services are deployed, connections between communication proxies one-to-one corresponding to the microservice applications form a mesh shown in FIG. 3, and the mesh includes different communication proxies capable of performing data exchange. In this way, the mesh becomes a communication infrastructure layer of microservices and carries all data between the microservices, and is referred to as a service mesh (service mesh). The service mesh is an infrastructure layer that is configured to process communication between different microservice applications.

Because the service mesh includes a large quantity of communication proxies, a control plane is added to the service mesh to centrally control the communication proxies in the service mesh more conveniently.

Figure 4:
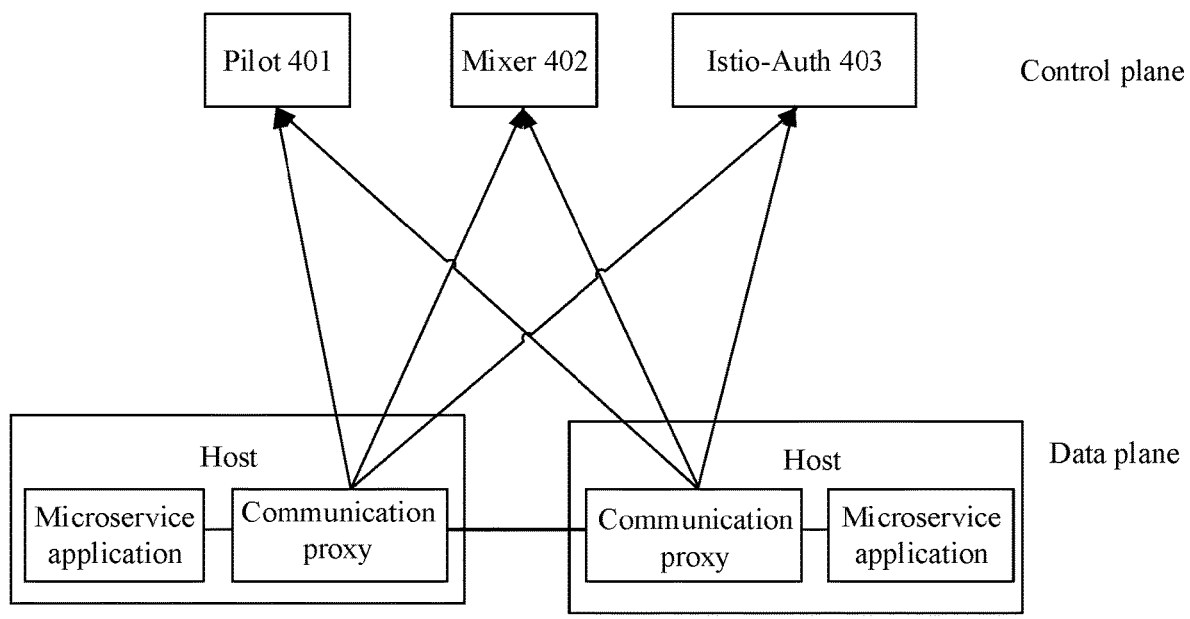
FIG. 4 is a schematic diagram of a structure of another embodiment of a microservice system according to an embodiment of the present invention.

With reference to FIG. 4, the following describes an example of a structure of a microservice system. The microservice system includes a control plane and a data plane, and the control plane includes three control plane components, that is, a pilot 401, a mixer 402, and an Istio authentication (Istio-Auth) 403. The data plane is a plurality of hosts on which a microservice application and a communication proxy are deployed. For description of the hosts, refer to the foregoing description. Details are not described herein. Because communication between different microservice applications included in the microservice system is all provided by a service mesh, the control plane can perform management and control functions such as monitoring, hosting, and control on communication of the data plane through cooperation between the control plane and the data plane.

Each control plane component in the pilot 401, the mixer 402, and the Istio-Auth 403 includes a control plane rule. The following describes a policy included in the control plane rule of each control plane component.

A control plane rule of the control plane component pilot 401 specifically includes a service registration and discovery policy, a routing rule policy, a protocol management policy, a traffic splitting policy, a circuit breaker policy, a fault management policy, a load balancing policy, and the like.

The service registration and discovery policy is used to cache all microservice access addresses in the current service mesh and a microservice service that can be implemented by each microservice access address. The microservice access address is an address used to access a microservice application. Specifically, when a microservice application that implements a specific microservice service needs to be called, a microservice request may be sent to a microservice position address of the microservice application. A communication proxy corresponding to the microservice application first receives the microservice request, and then processes the microservice request. After processing the microservice request, the communication proxy forwards the microservice request to the corresponding microservice application. It may be learned that the microservice access address is also an address of the communication proxy corresponding to the microservice application.

For example, when a microservice service implemented by the microservice system is a shopping service, the service registration and discovery policy of the pilot 401 may cache a first microservice access address, a second microservice access address, and a third microservice access address. A microservice service corresponding to the first microservice access address is a shopping cart microservice service, a microservice service corresponding to the second microservice access address is an order placing microservice service, and a microservice service corresponding to the third microservice access address is a delivery microservice service. When the shopping cart microservice service needs to be executed, a microservice application having the first microservice access address may be accessed. When the order placing microservice service needs to be executed, a microservice application having the second microservice access address may be accessed. When the delivery microservice service needs to be executed, a microservice application having the third microservice access address may be accessed.

The service registration and discovery policy is further used to interconnect with a registry server. The registry server may specifically include one or more different registry servers. During specific embodiments of an implementation, if a new microservice service is added to the current service mesh, an access address of a microservice application that can execute the new microservice service is registered with the registry server, and the service registration and discovery policy of the pilot 401 is synchronized with the registry server, to obtain the access address of the microservice application implementing the new microservice service and the microservice service implemented by the microservice application.

For example, if the new microservice service is an evaluation microservice service, and the evaluation microservice service needs to be added to the current service mesh, an access address of a microservice application that can execute the evaluation microservice service is registered with the registry server, and the service registration and discovery policy of the pilot 401 is synchronized with the registry server, to obtain the access address of the microservice application implementing the evaluation microservice service and the evaluation microservice service. In this way, if it is determined that the evaluation microservice service needs to be executed, the microservice application having the access address of the microservice application implementing the evaluation microservice service may be accessed, to implement the evaluation service.

A registry server included in the registry server is not limited in this embodiment. For example, the registry server may be an application (e.g., Kubernetes for example) used to manage containerization on a plurality of hosts on a cloud platform, a distributed computing framework (e.g., Mesos for example), or an open-source design-level framework (e.g., Spring for example) cloud platform.

The routing rule policy is used to determine an access address of a corresponding microservice application based on a microservice request. Specifically, after receiving the microservice request, the routing rule policy of the pilot 401 may obtain, based on the microservice request, a microservice service to be requested by the microservice request, and determine an access address of a microservice application that can implement the microservice service, so that the routing rule policy may route the microservice request to the access address of the corresponding microservice application.

For example, if a user selects a commodity on a microservice application A, and the microservice application A is a microservice application used to implement a shopping cart microservice service, the microservice application A may generate a microservice request, and the microservice request is used to request a microservice application B to process the microservice request sent by the microservice application A. The microservice application B is a microservice application used to implement a settlement microservice service. In this case, the routing rule policy may be synchronized with the registry server to query an access address of the microservice application B, and the routing rule policy may route the microservice request generated by the microservice application A to the microservice application B, so that the microservice application B implements the settlement microservice service based on the microservice request sent by the microservice application A.

The protocol management policy is used to for managing configuration of a network protocol of a communication proxy, so that the communication proxy can support a plurality of network protocols. In this way, for a plurality of communication proxies included in the service mesh, normal information transmission between different communication proxies can be implemented based on a configured network protocol.

For example, the protocol management policy may configure the Transmission Control Protocol (TCP), the Internet Packet Exchange (IPX) protocol, the Sequenced Packet Exchange (SPX) protocol, and the like on the communication proxy.

In the microservice system, if there are a plurality of microservice requests that request a same microservice service, and there are a plurality of microservice applications that implement the microservice service, the traffic splitting policy rule may distribute, based on a preset policy, the plurality of microservice requests to different microservice applications that can implement the microservice service.

For example, there are 100 microservice requests that request a same order evaluation microservice service, and microservice applications that implement the order evaluation microservice service are a microservice application A, a microservice application B, and a microservice application C. In this case, the traffic splitting policy may determine that 20 microservice requests in the 100 microservice requests are to be sent to the microservice application A, determine that 40 microservice requests in the 100 microservice requests are to be sent to the microservice application B, and determine that 40 microservice requests in the 100 microservice requests are to be sent to the microservice application C.

In the microservice system, there are many communication proxies. If one communication proxy becomes faulty, another communication proxy that exchanges information with the faulty communication proxy also cannot work normally, and fault is spread in the service mesh. As a result, the entire microservice system is finally broken down, and this architecture is more unstable than a conventional architecture. To resolve this problem, the circuit breaker policy is generated. The circuit breaker policy means that a calling communication proxy generates a microservice request and sends the microservice request to a receiving communication proxy, and after the calling communication proxy sends the microservice request to the receiving communication proxy, if the receiving communication proxy does not respond to the microservice request within preset duration, the circuit breaker policy returns an error response to the calling communication proxy in a timely manner, the calling communication proxy may send the microservice request to another communication proxy when receiving the error response, and the calling communication proxy does not need to wait for a long time. In this way, a calling thread between the calling communication proxy and the receiving communication proxy is not occupied for a long time due to a calling fault, thereby avoiding spread of the fault in the entire system.

For example, a microservice request sent by a microservice application A needs to be sent to a microservice application B. In this case, a communication proxy A corresponding to the microservice application A may send the request to a communication proxy B corresponding to the microservice application B. The circuit breaker policy monitors whether the communication proxy B responds in a timely manner after the communication proxy A sends the microservice request to the communication proxy B. If the communication proxy B does not respond within threshold duration, the circuit breaker policy returns an error response to the communication proxy A. In this case, the communication proxy A may send, in a timely manner, the microservice request to another communication proxy that can process the microservice request, thereby avoiding a disadvantage that a calling thread between the communication proxy A and the communication proxy B is occupied for a long time due to a fault that occurs in the communication proxy B.

The fault management policy specifically includes policies such as fault injection, fault detection, and fault self-healing. Specifically, for a microservice system, system robustness is very important. In the microservice system, a large quantity of microservice applications are used to implement different microservice services. When a problem occurs in some microservice applications, the microservice applications need to have high fault tolerance. Means such as retry, circuit breaking, and self-healing are used to ensure that the microservice applications in which the problem occurs can continue to work normally, so that the microservice system can continue to normally provide a service. Therefore, a robustness test needs to be fully performed on the microservice applications. One of biggest difficulties in the robustness test of the microservice applications is how to simulate a microservice system fault. Because the microservice system uses a service mesh to carry communication traffic between microservices, fault injection may be performed in the service mesh according to the fault management policy rule. Fault injection is used to inject a known fault into the microservice system, to simulate a case in which a fault occurs in some microservice applications, and test the robustness of the entire microservice system. Fault detection is used to continuously test a running problem of the microservice system, to ensure that the microservice system can run in various fault environments. During fault detection, one communication proxy in the service mesh may be randomly terminated, and by using this method, a test may be performed for a fault of a single communication proxy, to simulate a fault interruption case. Fault self-healing is used to recover a faulty microservice application, so that the recovered microservice application can normally provide a service. In most cases, an external system monitors a status of an instance of the microservice application, and the service is restarted when the microservice application is faulty for a period of time.

The load balancing policy is used to: if a plurality of microservice applications can process a same microservice request, select, from the plurality of microservice applications, one microservice application for processing the microservice request. For example, there are a plurality of microservice applications that are used to process a microservice request of flight seat selection, that is, a microservice application A, a microservice application B, and a microservice application C. In this case, the load balancing policy may select, from the microservice application A, the microservice application B, and the microservice application C by using a load balancing policy algorithm, a most suitable microservice application for processing the microservice request of flight seat selection. The load balancing policy is used to improve a success rate of processing the microservice request. The load balancing policy algorithm may be polling, randomization, weighted polling, or the like.

A control plane rule of the control plane component mixer 402 specifically includes a prerequisite check policy (Check), a quota management policy (Quota), and a data reporting policy (Report).

Before a microservice application responds to a microservice request, Check is used to verify the microservice request based on a prerequisite corresponding to the microservice request. The microservice application responds to the microservice request only after verification of the microservice request succeeds.

For example, Check first determines a microservice application that can process a microservice request for requesting a flight seat selection microservice service, and before Check sends the request to the determined microservice application, Check needs to verify whether a user account carried in the microservice request of the flight seat selection microservice service is the same as a preset user account. Only when the user account carried in the microservice request is the same as the preset user account, Check sends the microservice request to the determined microservice application, and the microservice application processes the microservice request for requesting the flight seat selection microservice service, to implement flight seat selection.

Quota is used to configure a preset quantity of connections between a first microservice application and a second microservice application. If a quantity of established connections between the first microservice application and the second microservice application is less than the preset quantity of connections, a connection may continue to be established between the first microservice application and the second microservice application. If the quantity of established connections between the first microservice application and the second microservice application is greater than or equal to the preset quantity of connections, no connection can be further established between the first microservice application and the second microservice application. The first microservice application and the second microservice application are any two microservice applications that are different from each other and that are included in the microservice system.

For example, if the first microservice application is used to implement a shopping cart microservice service, the second microservice application is used to implement an order settlement microservice service, and the preset quantity of connections is 1000, after each user implements the shopping cart microservice service on the first microservice application, the user triggers the first microservice application to establish a connection to the second microservice application, so that the user uses the connection to implement the order settlement microservice service on the second microservice application. Quota may collect statistics on the quantity of connections between the first microservice application and the second microservice application. If more than 1000 users have triggered the first microservice application to establish a connection to the second microservice application, Quota stops establishing a connection between the first microservice application and the second microservice application. In this case, if a new user wants to switch from the shopping cart microservice service to the order settlement microservice service, Quota controls the new user to be incapable of performing the order settlement microservice service. If less than 1000 users have triggered the first microservice application to establish a connection to the second microservice application, and if a new user wants to switch from the shopping cart microservice service to the order settlement microservice service, Quota controls the new user to be capable of normally implementing the order settlement microservice service by using the second microservice application.

In the microservice system, some back-end infrastructures usually need to be deployed to support service functions. These back-end infrastructures include policy classes such as access control, the quota management policy, and telemetry reporting. The mixer 402 is responsible for interconnecting with the back-end infrastructures for service monitoring data, including logs, service call chain status information, response results, and the like. The back-end infrastructures include an open-source data collector (e.g., Fluentd for example) for a unified logging layer, a component (e.g., Prometheus for example) for providing data collection, storage, processing, visualization, and alarms, a component (e.g., CloudWatch for example) for providing a monitoring service, and the like. It may be learned that the mixer 402 is used to implement communication between a communication proxy in a service mesh and the back-end infrastructures.

Report included in the mixer 402 is used to interconnect with different back-end infrastructures shown above, so that information exchange between the communication proxy and the back-end infrastructures is implemented by using Report. The following specifically describes how the communication proxy performs exchange with the back-end infrastructures by using Report.

First, after receiving a microservice request, the communication proxy may collect log data, monitoring data, and the like from the microservice request, and the communication proxy reports the collected log data, monitoring data, and the like to Report.

An adapter included in the mixer is connected to the back-end infrastructures. Report reports the log data, the monitoring data, and the like to the back-end infrastructures by using the adapter. The back-end infrastructures may implement functions such as tracking and charging for the communication proxy by using Report.

Management personnel may configure a security policy of access control in the Istio-Auth 403, so that the Istio-Auth 403 authenticates, based on the configured security policy, a security certificate carried in a request initiated by the communication proxy, and determines, based on the security policy, whether to allow the communication proxy to access another communication proxy in the service mesh.

Based on the foregoing description of the microservice system, it may be learned that, to implement communication between different communication proxies or to implement communication with the back-end infrastructures, a communication proxy that initiates communication needs to send a request to the control plane. The control plane components pilot 401, mixer 402, and Istio-Auth 403 included in the control plane need to process the request sent by communication proxy. When a large quantity of communication proxies send requests to the control plane, as a result, the control plane components included in the control plane process a large quantity of requests sent by the communication proxies, thereby causing burst traffic to the control plane, and very likely causing a fault of the control plane component included in the control plane.

Figure 5:
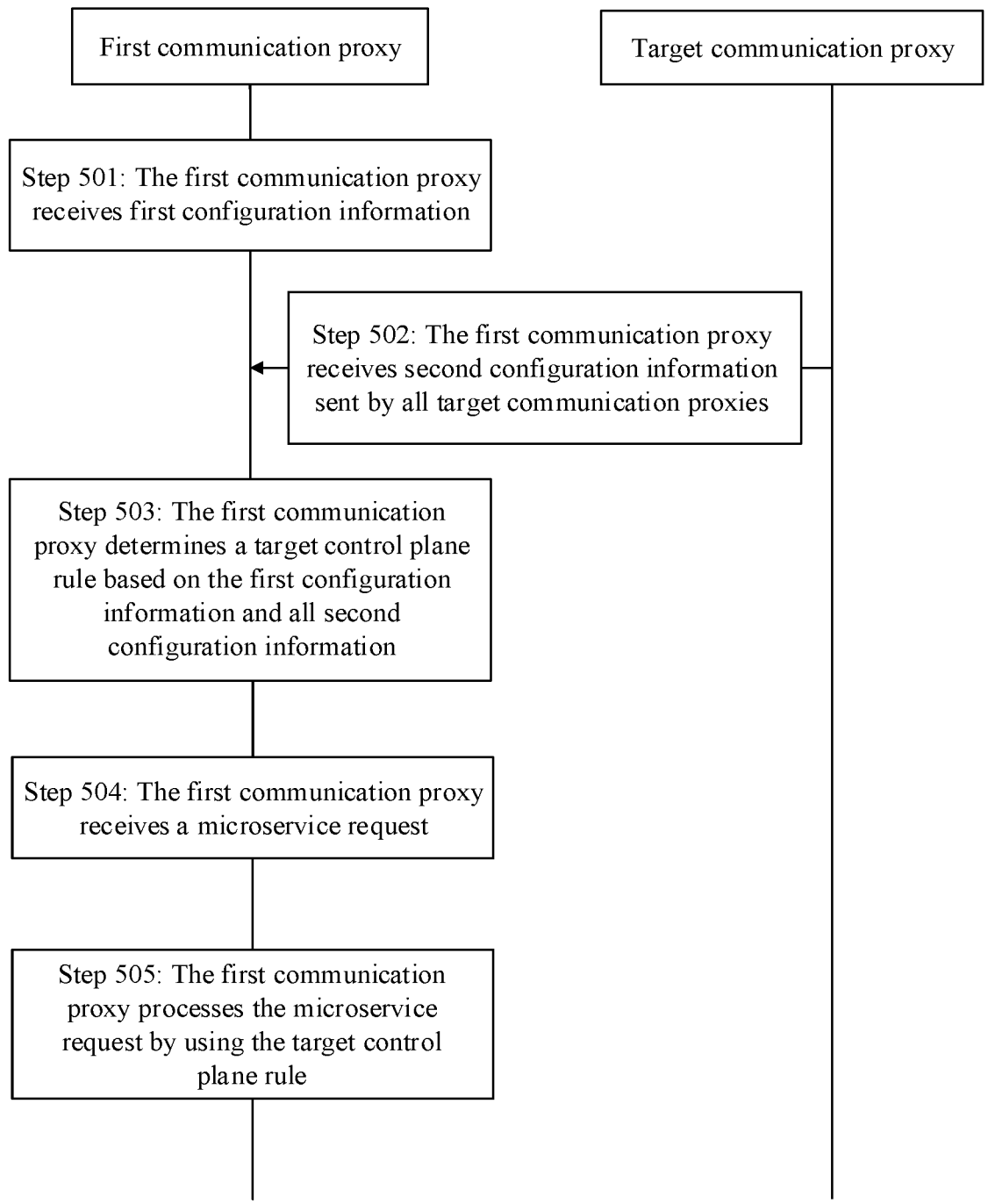
FIG. 5 is a flowchart of steps of another embodiment of a decentralization processing method according to an embodiment of the present invention.

Based on the microservice system shown in FIG. 4, the following describes, with reference to FIG. 5, an example of a specific execution process of a decentralization processing method provided in this application.

Step 501: A first communication proxy receives first configuration information.

According to the method shown in this embodiment, a control plane rule may be configured on each communication proxy by using the first configuration information, so that each communication proxy executes the control plane rule, thereby effectively reducing a quantity of microservice requests processed by a control plane. To implement configuration of a control plane rule supported by a service mesh, an operator may randomly select a first communication proxy in the service mesh. It may be learned that the first communication proxy shown in this embodiment is any communication proxy included in the service mesh.

A host in which the first communication proxy is located may provide an operation interface, and on the operation interface, the operator may enter the first configuration information to the first communication proxy as required. The first configuration information includes a correspondence between a first identifier and a first control plane rule. The first identifier is an identifier of a communication proxy in the service mesh, and the first control plane rule is a control plane rule that needs to be configured on the communication proxy having the first identifier. A specific quantity of correspondences between first identifiers and first control plane rules that are included in the first configuration information is not limited in this embodiment.

Optionally, the first identifier included in the first configuration information may be the same as an identifier of the first communication proxy. In this case, it indicates that the first configuration information is used to configure, by using the first control plane rule corresponding to the first identifier, a control plane rule supported by the first communication proxy.

Optionally, the first identifier included in the first configuration information is different from the identifier of the first communication proxy. In this case, it indicates that the first configuration information is used to configure, by using the first control plane rule corresponding to the first identifier, a control plane rule supported by the communication proxy having the first identifier.

To implement decentralization of the microservice system by using the first configuration information, the first control plane rule included in the first configuration information includes at least one policy included in a control plane rule shown in FIG. 4. Specifically, the first control plane rule may be at least some policies included in a control plane rule of a control plane component pilot, and/or at least some policies included in a control plane rule of a control plane component mixer, and/or a policy included in a control plane rule of a control plane component Istio-Auth. This is not specifically limited in this example.

The following describes several optional examples of the first control plane rule. It should be clarified that a specific policy included in the first control plane rule is not limited in this embodiment, provided that at least one policy of a control plane rule can be configured on at least one communication proxy included in the service mesh by using the first configuration information.

For example, the first configuration information used in this embodiment may include some policies of the control plane component pilot and some policies included in the control plane component mixer. The following describes an example with reference to FIG. 6.

Figure 6:
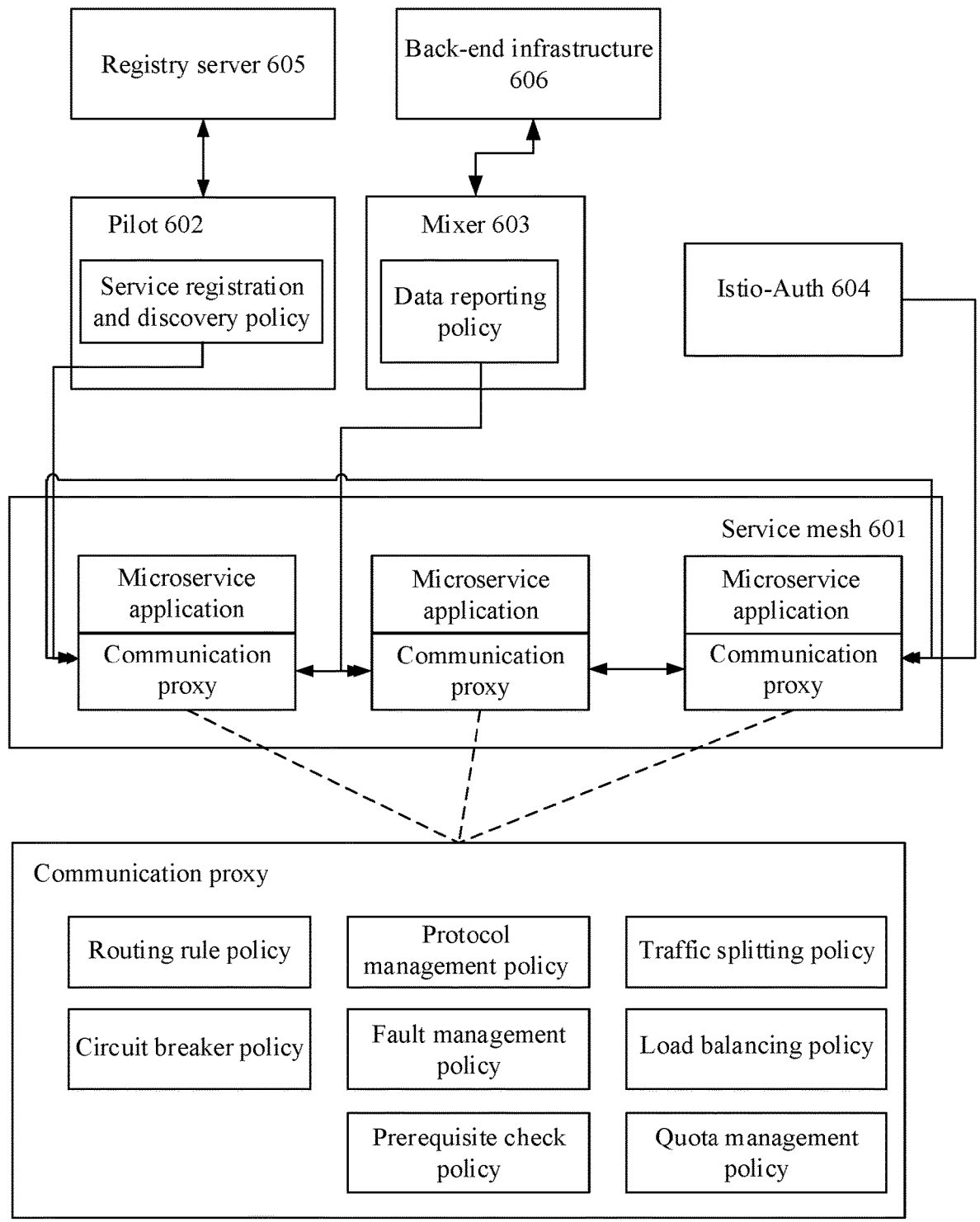
FIG. 6 is a schematic diagram of a structure of another embodiment of a microservice system according to an embodiment of the present invention.

FIG. 6 shows an example of a structure of a microservice system according to this embodiment. The microservice system shown in this embodiment includes a data plane and a control plane. The data plane shown in this embodiment includes a service mesh 601. For a specific description of the service mesh 601, refer to the description of FIG. 3. Details are not described in this embodiment. The control plane shown in this embodiment includes three control plane components, that is, a pilot 602, a mixer 603, and an Istio-Auth 604.

Some policies included in a control plane component pilot shown in the conventional technology may be configured on a communication proxy by using the first configuration information shown in this embodiment. It may be learned from FIG. 4 that, policies included in a control plane rule of the control plane component pilot are a service registration and discovery policy, a routing rule policy, a protocol management policy, a traffic splitting policy, a circuit breaker policy, a fault management policy, and a load balancing policy. In this case, the first configuration information shown in this embodiment may be used to configure some policies in the service registration and discovery policy, the routing rule policy, the protocol management policy, the traffic splitting policy, the circuit breaker policy, the fault management policy, and the load balancing policy on the communication proxy.

In this embodiment, a policy retained on the control plane component pilot and a policy that is of the original control plane component pilot and that is configured on the communication proxy are not limited, provided that some policies of the original control plane component pilot are configured on the communication proxy. For a specific description of the policies of the original control plane component pilot, refer to the description of FIG. 4. Details are not described in this embodiment.

In the example shown in FIG. 6, that the first control plane rule includes the routing rule policy, the protocol management policy, the traffic splitting policy, the circuit breaker policy, the fault management policy, and the load balancing policy is used as an example. In this case, compared with that shown in FIG. 4, the pilot of the control plane shown in this embodiment retains only the service registration and discovery policy.

In this example, a reason why the service registration and discovery policy is retained in the pilot is that the service registration and discovery policy is mainly used to interconnect with a registry server 605, so that the service registration and discovery policy obtains data stored in the service registry server. The communication proxy only needs to periodically obtain the data stored in the service registry server from the pilot configured with the service registration and discovery policy, and information exchanged between different communication proxies does not need to pass through the service registration and discovery policy of the pilot. In this way, a burst of the information exchanged between the communication proxies does not affect the pilot configured with the service registration and discovery policy.

It may be learned that, in this example, in all original policies of the pilot 602, all policies except the service registration and discovery policy are configured on the communication proxy included in the service mesh. Therefore, in the example shown in FIG. 6, the pilot 602 does not need to have the routing rule policy, the protocol management policy, the traffic splitting policy, the circuit breaker policy, the fault management policy, and the load balancing policy that the communication proxy already has.

Some policies included in a control plane component mixer shown in the conventional technology may be configured on a communication proxy by using the first configuration information shown in this embodiment. It may be learned from FIG. 4 that, policies included in a control plane rule of the control plane component mixer are Check, Quota, and Report. The first configuration information shown in this embodiment may be used to configure Check and Quota on the communication proxy, and only Report is configured on the mixer.

It may be learned that, in this example, in all original policies of the mixer 603, all policies except Report are configured on the communication proxy included in the service mesh. Therefore, in the example shown in FIG. 6, the mixer 603 does not need to have Check and Quota functions that the communication proxy already has. In this example, the mixer 603 has only the Report policy.

When the mixer 603 retains a Report function, the mixer 603 may interconnect with a back-end infrastructure 606 by using the Report function. For a specific description of the back-end infrastructure 606, refer to the foregoing description. Details are not described in this embodiment.

In this example, a function of the Istio-Auth 604 is retained on the Istio-Auth 604, and the function of the Istio-Auth 604 is not configured on the first communication proxy by using the first configuration information. Therefore, the microservice system shown in this example includes the control plane component Istio-Auth 604.

It should be clarified that the example shown in FIG. 6 is merely an optional example of the decentralization processing method shown in this application, and a specific policy indicated by the first control plane rule included in the first configuration information is not limited.

For another example, the first configuration information used in this embodiment may include some policies of the control plane component pilot, all policies included in the control plane component mixer, and all policies included in the Istio-Auth that are to be configured on a communication proxy. This example is specifically described with reference to FIG. 7.

Figure 7:
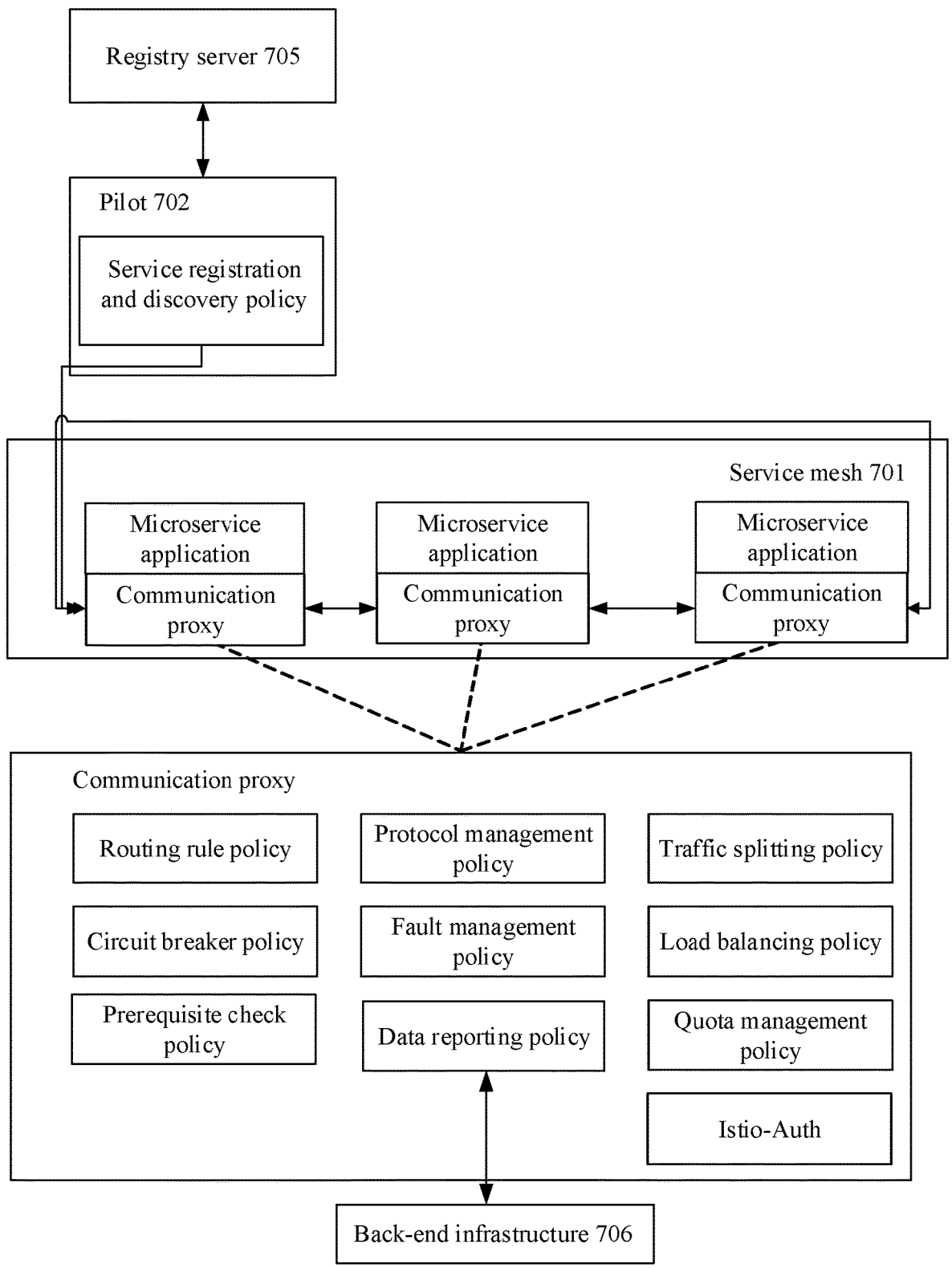
FIG. 7 is a schematic diagram of a structure of another embodiment of a microservice system according to an embodiment of the present invention.

As shown in FIG. 7, a microservice system shown in this embodiment includes a data plane and a control plane. The data plane includes a service mesh 701. For a specific description of the service mesh 701, refer to the embodiment shown in FIG. 3. Details are not described in this embodiment. The control plane shown in this embodiment may include only one control plane component, that is, a pilot 702. As shown in this embodiment, all policies included in the control plane components mixer and Istio-Auth included in FIG. 4 are configured on a communication proxy, so that decoupling between the communication proxy and the control plane is implemented.

As shown in FIG. 7, that the first control plane rule included in the first configuration information includes the routing rule policy, the protocol management policy, the traffic splitting policy, the circuit breaker policy, the fault management policy, and the load balancing policy is used as an example. For a specific description, refer to the description of FIG. 6. Details are not described in this embodiment.

It may be learned that, in this example, in all original functions of the pilot 702, all policies except the service registration and discovery policy are configured on the communication proxy. Therefore, in the example shown in FIG. 7, the pilot 702 does not need to have the routing rule policy, the protocol management policy, the traffic splitting policy, the circuit breaker policy, the fault management policy, and the load balancing policy that the communication proxy already has. In this example, the pilot 702 has only the service registration and discovery policy.

When the pilot 702 retains a service registration and discovery policy function, the pilot 702 may interconnect with a registry server 705 by using the service registration and discovery policy function. For a specific description of the registry server 705, refer to the foregoing description. Details are not described in this embodiment.

Specifically, in this example, to implement decoupling between the communication proxy and the mixer, all policies of the mixer are configured on the communication proxy. As shown in FIG. 7, policies related to Check, Quota, and Report functions of the mixer are configured on the communication proxy.

On the premise that the communication proxy has the Report function, the communication proxy may interconnect with a back-end infrastructure 706 by using the Report function. For a specific description of the back-end infrastructure 706, refer to the foregoing description. Details are not described in this embodiment.

In this example, decoupling between the communication proxy and the Istio-Auth of the control plane may be further implemented. Specifically, a policy related to an Istio-Auth function is configured on the communication proxy by using the first configuration information. For a specific description of the Istio-Auth function, refer to the foregoing description. Details are not described.

Figure 8:
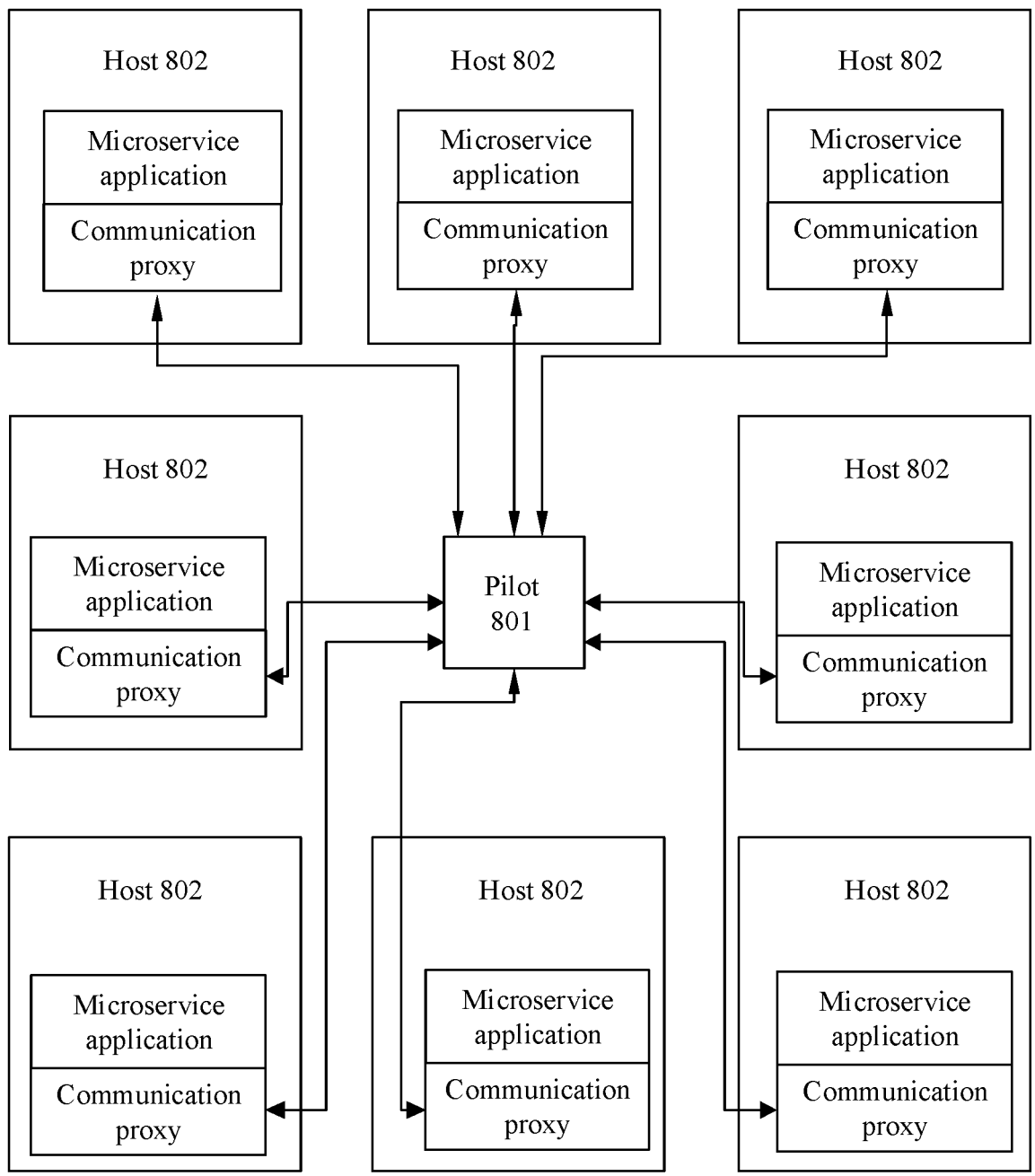
FIG. 8 is a schematic diagram of a structure of another embodiment of a microservice system according to an embodiment of the present invention.

It may be learned that the microservice system shown in this embodiment may implement decoupling between the data plane and the control plane. With reference to FIG. 8, the following describes a specific structure of a microservice system that implements the method shown in this embodiment.

As shown in FIG. 8, the microservice system includes a pilot 801 and a plurality of hosts 802, and each host 802 includes a microservice application and a communication proxy. For a specific description of the host 802, refer to the foregoing description. Details are not described in this embodiment. For a specific description of a function included in the pilot 801, refer to the description of FIG. 8. Details are not described.

It may be learned from the microservice system shown in FIG. 8 that, compared with a microservice system shown in the conventional technology, policies of a mixer and an Istio-Auth do not need to be set on a control plane shown in this embodiment. Only a service registration and discovery policy function of the pilot 801 needs to be retained on the control plane, and the rest can be set on the communication proxy.

In this embodiment, specific policies configured on different communication proxies in a service mesh are not limited, provided that the microservice system has the structure shown in FIG. 8.

Optionally, in another example, all policies of the control plane may alternatively be configured on the communication proxy, so that the microservice system no longer includes the pilot, the mixer, and the Istio-Auth.

It should be clarified that, in this embodiment, an example in which the first configuration information obtained by the first communication proxy is configured by the operator on the first communication proxy is used for description. In another example, the first configuration information may alternatively be configuration information that has been configured and stored locally on the first communication proxy after the first communication proxy performs the decentralization method shown in this embodiment. This is not specifically limited, provided that the first configuration information includes a correspondence between an identifier of at least one communication proxy included in the service mesh and a control plane rule, or the first configuration information indicates that no control plane rule is configured on the first communication proxy.

Step 502: The first communication proxy receives second configuration information sent by all target communication proxies.

All the target communication proxies shown in this embodiment are all communication proxies that are in the microservice system and that are different from the first communication proxy. For example, if there is a communication proxy A, a communication proxy B, a communication proxy C, a communication proxy D, and a communication proxy E in the service mesh, when the first communication proxy is the communication proxy C, the communication proxy A, the communication proxy B, the communication proxy D, and the communication proxy E are all the target communication proxies. In this example, the communication proxy C needs to receive second configuration information sent by the communication proxy A, receive second configuration information sent by the communication proxy B, receive second configuration information sent by the communication proxy D, and receive second configuration information sent by the communication proxy E.

The following describes the second configuration information:

In an optional example, if a target communication proxy is not configured with a control plane rule and does not receive configuration information sent by another communication proxy, second configuration information generated by the target communication proxy is blank information, or second configuration information generated by the target communication proxy includes a field used to indicate that no control plane rule is configured. This is not specifically limited in this embodiment, provided that when the first communication proxy receives the second configuration information, it may be determined, based on the second configuration information, that no control plane rule is configured on the target communication proxy that sends the second configuration information.

In another optional example, the second configuration information includes a second identifier and a second control plane rule. The second identifier is an identifier of a communication proxy that is in the service mesh and that is different from the first communication proxy. The second control plane rule includes a control plane rule that needs to be configured on the communication proxy having the second identifier. For a specific description of the second identifier in this embodiment, refer to the foregoing description of the first identifier. For a description of the second configuration information, refer to the foregoing description of the first configuration information. Details are not described.

Step 503: The first communication proxy determines a target control plane rule based on the first configuration information and all second configuration information.

In this embodiment, when the first communication proxy receives the first configuration information entered by the operator, and the first communication proxy receives the second configuration information sent by all the target communication proxies, the first communication proxy may determine the target control plane rule based on the first configuration information and all the second configuration information, and the target control plane rule includes a control plane rule corresponding to the identifier of the first communication proxy.

In this embodiment, a correspondence between the identifier of the first communication proxy and the target control plane rule may be set in the first configuration information, and/or the correspondence between the identifier of the first communication proxy and the target control plane rule may be set in at least one piece of second configuration information.

When the first communication proxy receives the first configuration information and all the second configuration information, the first communication proxy may determine, from the first configuration information and all the second configuration information, the target control plane rule corresponding to the identifier of the first communication proxy.

For example, it is assumed that the first configuration information includes a communication proxy identifier A and a corresponding control plane rule A, one piece of second configuration information includes a communication proxy identifier B and a corresponding control plane rule B, another piece of second configuration information includes a communication proxy identifier C and a corresponding control plane rule C, and another piece of second configuration information includes a communication proxy identifier D and a corresponding control plane rule D.

When the identifier of the first communication proxy is B, the first communication proxy may determine, from the first configuration information and all the second configuration information, the target control plane rule corresponding to the identifier of the first communication proxy. In this example, because the identifier of the first communication proxy is B, the first communication proxy may determine that the target control plane rule includes the control plane rule B corresponding to the communication proxy identifier B.

Step 504: The first communication proxy receives a microservice request.

Step 505: The first communication proxy processes the microservice request by using the target control plane rule.

It may be learned from the foregoing description that the microservice system implements a specific service by processing a microservice request based on each microservice application included in the microservice system to implement a corresponding microservice service. For example, if a service implemented by the microservice system is a shopping service, microservice services implemented by microservice applications included in the microservice system are a commodity browsing microservice service, a shopping cart microservice service, a discount information calculation microservice service, an order settlement microservice service, a delivery microservice service, and the like. Functions of the microservice system are implemented by processing microservice requests by using the microservice applications.

An entity of sending the microservice request received by the first communication proxy is not limited in this embodiment. For example, the microservice request received by the first communication proxy shown in this embodiment may be a first microservice request sent by a first microservice application, and the first microservice application is a microservice application corresponding to the first communication proxy. It may be learned that, in this example, the first microservice request received by the first communication proxy is sent by the first microservice application. For another example, the microservice request received by the first communication proxy shown in this embodiment may alternatively be a second microservice request, and the second microservice request is sent by a target microservice application. The target microservice application and the first microservice application are two different microservice applications in the service mesh.

Continuing to use the foregoing example, if a microservice service implemented by the first microservice application corresponding to the first communication proxy is the commodity browsing microservice service, the first microservice request received by the first communication proxy is sent by the first microservice application, and specifically, the first microservice application generates a corresponding first microservice request based on a request event generated when a user clicks a commodity icon displayed on a web page. In this case, the first microservice request is sent by the first microservice application corresponding to the first communication proxy. For another example, if the microservice service implemented by the first microservice application is the shopping cart microservice service, the second microservice request received by the first communication proxy is sent by a microservice application that implements the commodity browsing microservice service, and the second microservice request is used to request the shopping cart microservice service. Specifically, the second microservice request is used to indicate information such as a selected commodity and a user account. In this case, when the first microservice application receives the microservice request by using the first communication proxy, the first microservice application sets, in a shopping cart, an identifier of the selected commodity indicated by the second microservice request.

Specifically, in this embodiment, at least one policy of the control plane is configured on the first communication proxy by using the first configuration information and all the second configuration information shown above. Therefore, the first communication proxy can perform corresponding processing on the microservice request based on an indication of the target control plane rule. With reference to a specific policy included in the target control plane, the following describes an example of a specific manner in which the first communication proxy performs processing.

In an example, if the target control plane rule includes a service registration and discovery policy, the first communication proxy may interconnect with a registry server to obtain all microservice access addresses in the current service mesh and a microservice service that can be implemented by each microservice access address. For a specific description of the service registration and discovery policy, refer to the embodiment shown in FIG. 4. Details are not described in this example.

In another example, if the target control plane rule includes a routing rule policy corresponding to the first microservice request, specifically, the routing rule policy corresponding to the first microservice request includes a correspondence between the first microservice request and a microservice access address. The microservice request is used to request a target microservice service, and the target microservice service is a microservice service that can process the first microservice request sent by the first microservice application. The microservice access address is an address of a microservice application used to implement the target microservice service.

When the first communication proxy determines the routing rule policy, the first communication proxy may process the first microservice request based on the routing rule policy. Specifically, the first communication proxy determines, by querying the routing rule policy, the microservice access address corresponding to the first microservice request, and the first communication proxy sends the first microservice request to the microservice access address.

For example, if the microservice service implemented by the first microservice application is a shopping cart microservice service, the first microservice application generates the first microservice request after an operation performed by the first microservice application on a commodity selected by a user is completed. The first microservice request may carry an identifier of the commodity selected by the user, account information of the user, a microservice service to be requested being an order settlement microservice service, and the like. Specifically, content carried in the first microservice request is not limited, provided that the first microservice request is used to call a microservice application that implements the order settlement microservice service. The first microservice application sends the first microservice request to the first communication proxy, and the first communication proxy determines, based on the first microservice request sent by the first microservice application, that the microservice service requested by the first microservice request is the order settlement microservice service. In this case, the first communication proxy queries a locally stored routing rule policy based on the configured target control plane rule, and the first communication proxy may determine a microservice access address corresponding to the first microservice request used to request the order settlement microservice service. The microservice access address is an address of a second microservice application used to implement the order settlement microservice service. The first communication proxy sends the first microservice request to the microservice access address. A second communication proxy corresponding to the second microservice application may receive the first microservice request sent by the first communication proxy, and the second communication proxy forwards the first microservice request to the second microservice application, so that the second microservice application used to implement the order settlement microservice service can receive the first microservice request. The second microservice application used to implement the order settlement microservice service may implement the order settlement microservice service based on the first microservice request.

In another example, if the target control plane rule includes a protocol management policy, the first communication proxy may configure a network protocol of the first communication proxy, to enable the first communication proxy to support a plurality of network protocols, thereby enabling the first communication proxy to successfully perform, based on the configured network protocol, information transmission with any communication proxy included in the service mesh. For a specific description of the protocol management policy, refer to the description shown in FIG. 4. Details are not described.

In another example, when the first communication proxy receives a plurality of first microservice requests and determines a plurality of microservice access addresses based on the routing rule policy, the first communication proxy may send the first microservice requests based on a traffic splitting policy that is included in the target control plane rule and that is corresponding to the first microservice requests.

Specifically, the traffic splitting policy is used to indicate a quantity of first microservice requests to be sent to each microservice access address. The traffic splitting policy shown in this embodiment includes a correspondence between each second microservice application in a plurality of second microservice applications and a split proportion. The first microservice application sends a plurality of microservice requests to the first communication proxy, and the plurality of microservice requests are used to request a same target microservice service. The plurality of second microservice applications are all used to implement the target microservice service.

For example, the target microservice service requested by the plurality of first microservice requests sent by the first microservice application is an order settlement microservice service, and the plurality of second microservice applications are all used to implement the order settlement microservice service.

When the first communication proxy determines that the target control plane rule includes the traffic splitting policy, the first communication proxy sends a target quantity of first microservice requests to a target second microservice application, and the target second microservice application is any microservice application in the plurality of second microservice applications. The target quantity is a product of a total quantity of microservice requests and a split proportion corresponding to the target second microservice application.

For ease of understanding, the following uses a specific example for description. In the traffic splitting policy shown in this embodiment, a preset splitting list may be prestored, and the preset splitting list includes identifiers of a plurality of second microservice applications. The preset splitting list includes a correspondence between an identifier of each second microservice application and a split proportion. In this embodiment, the plurality of second microservice applications in the same preset splitting list implement a same microservice service, and are all used to implement the microservice service requested by the first microservice requests. The following describes the preset splitting list with reference to Table 1.

TABLE 1

| Identifier of a Second Microservice Application | Split proportion |
|---|---|
| Second microservice application A | 10% |
| Second microservice application B | 20% |
| Second microservice application C | 30% |
| Second microservice application D | 40% |

All second microservice applications included in Table 1 shown in this embodiment are used to implement an order settlement microservice service. In the service mesh shown in this embodiment, that the second microservice applications used to implement the order settlement microservice service are the second microservice application A, the second microservice application B, the second microservice application C, and the second microservice application D is used as an example, and that the first microservice application shown in this embodiment is used to implement a shopping cart microservice service is used as an example. When the first microservice application implements shopping cart microservice services of a plurality of users, the first microservice application generates a first microservice request corresponding to each user, and the first microservice request includes information such as corresponding user account information, a commodity selected by the user, and a requested microservice service being the order settlement microservice service.

For example, the first microservice application shown in this embodiment processes shopping cart microservice services of 1000 users. After the 1000 users select commodities, the first microservice application generates 1000 first microservice requests, and sends the 1000 first microservice requests to the first communication proxy.

After receiving the 1000 microservice requests, the first communication proxy determines that there are a plurality of second microservice applications that are called by the 1000 microservice requests and that are used to implement the order placing microservice service, that is, the second microservice application A, the second microservice application B, the second microservice application C, and the second microservice application D. In this case, the first communication proxy may send 1000×10%=100 first microservice requests to the second microservice application A based on Table 1, the first communication proxy sends 1000×20%=200 first microservice requests to the second microservice application B based on Table 1, the first communication proxy sends 1000×30%=300 first microservice requests to the second microservice application C based on Table 1, and the first communication proxy sends 1000×40%=400 first microservice requests to the second microservice application D based on Table 1, to avoid sending a large quantity of microservice requests only to some microservice applications. This reduces impact of burst traffic on the microservice applications, and reduces quantities of microservice requests processed by the microservice applications.

In another example, if the target control plane rule includes a circuit breaker policy, the circuit breaker policy is used to indicate preset response duration.

When the first communication proxy determines that the target control plane rule includes the circuit breaker policy, if the first communication proxy receives a first microservice request sent by the first microservice application, and the first communication proxy determines that the first microservice request needs to be sent to a second microservice application, the first communication proxy may determine whether a successful response message sent by the second microservice application is received within the preset response duration indicated by the circuit breaker policy. A microservice service requested by the first microservice request is the same as a microservice service implemented by the second microservice application, and the successful response message is used to indicate that the second microservice application successfully receives the first microservice request.

If the first communication proxy determines that the successful response message is not received within the preset response duration, it indicates that a second communication proxy corresponding to the second microservice application becomes faulty, and the faulty second communication proxy cannot implement normal information exchange between the first microservice application and the second microservice application. To avoid a disadvantage that fault spread occurs in the microservice system due to a fault that occurs in the communication proxy, the first communication proxy shown in this embodiment sends the first microservice request to a third microservice application. The second microservice application is different from the third microservice application, and a microservice service supported by the third microservice application is the same as the microservice service requested by the first microservice request.

It may be learned that, according to this embodiment, after the circuit breaker policy is configured on the first communication proxy, if the first microservice request sent by the first communication proxy is not successfully received, the first communication proxy may switch the communication proxy that is to receive the first microservice request, until the first microservice request is successfully received. In this way, a case in which fault spread occurs in the microservice system due to a fault that occurs in the communication proxy is effectively avoided. For a better understanding of this embodiment, the following uses a specific example for description.

In this example, the microservice service implemented by the first microservice application is a shopping cart microservice service. In this case, the first microservice application generates a first microservice request after implementing the shopping cart microservice service, and the first microservice request is used to request an order settlement microservice service.

After receiving the first microservice request sent by the first microservice application, the first communication proxy may determine a second microservice application based on the first microservice request, and the second microservice application is used to implement the order settlement microservice service.

The first communication proxy sends the first microservice request to a second communication proxy corresponding to the second microservice application, and starts a timer on the first communication proxy side, to determine whether a successful response message sent by the second communication proxy is received within the preset response duration indicated by the circuit breaker policy.

If the timer expires, and the first communication proxy does not receive the successful response message sent by the second communication proxy, the first communication proxy may determine that the second communication proxy is faulty and cannot continue processing the order settlement microservice service.

The first communication proxy may determine a third microservice application in the microservice system, and the third microservice application is also configured to process the order settlement microservice service. In this case, the first communication proxy may send the first microservice request to a third communication proxy corresponding to the third microservice application.

The foregoing steps are cyclically performed until the first communication proxy successfully sends the first microservice request to a microservice application used to execute the order settlement microservice service.

In another example, if the target control plane rule includes a fault management policy, the first communication proxy may perform fault injection, fault detection, and fault self-healing. For a specific description of the fault management policy, refer to the description of FIG. 4. Details are not described.

Specifically, a known fault may be configured on the first communication proxy configured with fault injection, and the known fault may be sent to the first microservice application, to simulate a case in which a fault occurs in a second microservice application in the microservice system. The second microservice application is a microservice application different from the first microservice application. For another example, the first communication proxy may alternatively send a known fault to a second communication proxy, to simulate a case in which a fault occurs in the first microservice application. The first communication proxy configured with fault detection may continuously detect a running problem of the first microservice application, to detect whether there is a problem in running of the first microservice application and what kind of problem occurs. The first communication proxy configured with fault self-healing can recover the faulty first microservice application, so that the recovered first microservice application can normally provide a service. The first communication proxy may further monitor a status of an instance of the first microservice application, and the first microservice application is restarted when the first microservice application is faulty for a period of time.

In another example, if the target control plane rule includes a load balancing policy corresponding to the first microservice request, specifically, the first communication proxy receives the first microservice request sent by the first microservice application, and determines that microservices supported by a plurality of second microservice applications are the same as the microservice service requested by the first microservice request. That is, the plurality of second microservice applications can all process the same first microservice request.

The first communication proxy configured with the load balancing policy may select a target second microservice application from the plurality of second microservice applications for processing, and process the first microservice request only by using the selected target second microservice application. For example, the microservice service requested by the first microservice request is a flight seat selection microservice service, and there are a plurality of second microservice applications that can implement the flight seat selection microservice service, that is, a second microservice application A, a second microservice application B, and a second microservice application C. In this case, the first communication proxy configured with the load balancing policy may select, from the second microservice application A, the second microservice application B, and the second microservice application C by using a load balancing policy algorithm, a most suitable second microservice application for processing the first microservice request as the target second microservice application. The load balancing policy is used to improve a success rate of processing the microservice request. The load balancing policy algorithm may be polling, randomization, weighted polling, or the like.

In another example, if the target control plane rule includes a prerequisite check policy (Check) corresponding to a second microservice request, the prerequisite check policy is used to indicate preset verification information.

The first communication proxy configured with the prerequisite check policy determines whether verification information included in the second microservice request is the same as the preset verification information. The second microservice request is a microservice request sent by a second microservice application. For a specific description, refer to the foregoing description. Details are not described.

If the first communication proxy determines that the verification information included in the second microservice request is the same as the preset verification information, the first communication proxy sends the second microservice request to the first microservice application.

If the first communication proxy determines that the verification information included in the second microservice request is different from the preset verification information, the first communication proxy does not send the second microservice request to the first microservice application.

For ease of understanding, the following uses a specific example for description.

In this example, the preset verification information indicated by the prerequisite check policy may be account information A.

The first communication proxy receives the second microservice request sent by the second microservice application, and a microservice service requested by the second microservice request is an order settlement microservice service. The microservice service implemented by the first microservice application is the order settlement microservice service, and a microservice service implemented by the second microservice application is a shopping cart microservice service.

When the second microservice application implements the shopping cart microservice service, the second microservice application may send the second microservice request to the second communication proxy, and the second microservice request may include information about a commodity selected by a user, account information of the user, being used to request the order settlement microservice service, and other information.

The second communication proxy sends the second microservice request to the first communication proxy.

When the first communication proxy receives the second microservice request, the first communication proxy may determine whether the account information of the user carried in the second microservice request is the same as the preset verification information indicated by the prerequisite check policy. In this example, if the first communication proxy determines that the account information of the user carried in the second microservice request is the account information A, it indicates that the user with the account information A has permission to access the first microservice application. In this case, the first communication proxy may send the second microservice request to the first microservice application, so that the first microservice application implements the order settlement microservice service based on the second microservice request.

In another example, if the target control plane rule includes a quota management policy (Quota) corresponding to the second microservice request, the quota management policy is used to indicate a preset connection quantity. In a process in which the first communication proxy performs processing based on the quota management policy, the first communication proxy first obtains a target connection quantity, and the target connection quantity is a quantity of second microservice requests currently being processed by the first microservice application.

The first communication proxy determines whether the target connection quantity is greater than or equal to the preset connection quantity.

If the first communication proxy determines that the target connection quantity is less than the preset connection quantity, the first communication proxy sends the second microservice request to the first microservice application.

If the first communication proxy determines that the target connection quantity is greater than or equal to the preset connection quantity, the first communication proxy no longer sends the second microservice request to the first microservice application, that is, the first communication proxy stops sending the second microservice request to the first microservice application.

For ease of understanding, the following uses a specific example for description.

For example, the first microservice application is used to implement an order settlement microservice service, the second microservice application is used to implement a shopping cart microservice service, and the preset connection quantity indicated by the quota management policy is 1000. In this case, after each user implements the shopping cart microservice service on the second microservice application, the user triggers, by using the second microservice request, the second microservice application to establish a connection to the first microservice application, so that the user uses the connection to implement the order settlement microservice service on the first microservice application.

The first communication proxy configured with the quota management policy may collect statistics on the quantity of second microservice requests currently being normally processed by the first microservice application. If the quantity of second microservice requests currently being processed by the first microservice application, that is, a quantity of order settlement microservice services currently being processed by the first microservice application exceeds 1000, it indicates that more than 1000 users are currently implementing order settlement microservice services by using the first microservice application. In this case, the first communication proxy no longer allows a new second microservice request to be sent to the first microservice application. It may be learned that, in this case, if a new user wants to switch from the shopping cart microservice service to the order settlement microservice service, the first communication proxy controls the new user to be incapable of performing the order settlement microservice service.

If the quantity of second microservice requests currently being processed by the second microservice application, that is, the quantity of order settlement microservice services currently being processed by the first microservice application is less than 1000, it indicates that less than 1000 users are currently implementing order settlement microservice services by using the first microservice application. In this case, the first communication proxy continues to establish a connection between the first microservice application and the second microservice application. That is, the first communication proxy allows the new user to send the second microservice request to the first microservice application.

In another example, if the target control plane rule includes a data reporting policy, the data reporting policy is used to connect to a back-end infrastructure. For a specific description of the back-end infrastructure, refer to the description of FIG. 4. Details are not described.

Specifically, for the first communication proxy configured with the data reporting policy, if the data reporting policy corresponds to the first microservice request, when the first communication proxy receives the first microservice request, the first communication proxy may report the first microservice request to the back-end infrastructure. If the data reporting policy corresponds to the second microservice request, when the first communication proxy receives the second microservice request, the first communication proxy may report the second microservice request to the back-end infrastructure. For specific descriptions of the first microservice request and the second microservice request, refer to the foregoing description. Details are not described.

Specifically, after receiving the first microservice request, the first communication proxy may send log data, monitoring data, and the like included in the first microservice request to the back-end infrastructure. The back-end infrastructure may implement functions such as tracking and charging for the communication proxy by using the log data, the monitoring data, and the like included in the first microservice request sent by the first communication proxy. For a process of processing performed by the back-end infrastructure on the second microservice request, refer to the foregoing process of processing performed by the back-end infrastructure on the first microservice request. Details are not described.

In another example, if the target control plane rule includes a policy of the Istio-Auth, the first communication proxy configured with the policy of the Istio-Auth authenticates, based on a configured security policy, a security certificate carried in the second microservice request, and determines, based on the security policy, whether to allow the first microservice application corresponding to the first communication proxy to respond to the second microservice request.

According to the method shown in this embodiment, because the control plane rule of the control plane may be configured on the communication proxy of the data plane, pressure on resources of the control plane that are used to execute a policy configured on the communication proxy is relieved, and consumption of control plane resources is reduced. In addition, because the control plane is configured on the communication proxy, the communication proxy may perform a function of the control plane based on the configuration. This reduces traffic of information sent by the communication proxy to the control plane, reduces impact of a burst of the traffic sent by the communication proxy to the control plane on the control plane, and effectively prevents service provisioning and operation and maintenance from being affected by diffusion of an unknown fault (such as a silent fault) on the control plane.

In addition, according to the method shown in this embodiment, when a policy related to the control plane is configured in the service mesh, only one communication proxy may be randomly selected in the service mesh, and the communication proxy may exchange configuration information with different communication proxies. The communication proxy may determine, based on configuration information locally stored in the communication proxy and configuration information sent by another communication proxy, a control plane rule corresponding to an identifier of the communication proxy. It may be learned that, in a policy configuration process, the operator may implement policy configuration for a specific communication proxy without selecting the specific communication proxy from many communication proxies, thereby improving efficiency and accuracy of the policy configuration for the communication proxy.

That the method shown in this embodiment is used to configure a mixer policy on the communication proxy is used as an example. In the conventional technology, the mixer is configured to carry a communication bridge between different communication proxies of the data plane in a specific communication process, and further carry a communication bridge between the communication proxy and the back-end infrastructure. In the specific communication process, the communication proxy sends a request to the mixer, and the mixer implements communication between the communication proxy and the back-end infrastructure and communication between different communication proxies based on the request. However, when there are many microservice requests, a large quantity of communication proxies send a large quantity of microservice requests to the mixer. Because each microservice request needs to be routed by using the mixer, a burst of traffic of the large quantity of microservice requests sent by the communication proxies may affect the mixer. Under the impact of a large amount of traffic, the mixer is prone to become faulty due to the impact of burst traffic. Once the mixer becomes faulty, a purpose of routing the microservice requests sent by the communication proxies cannot be implemented by using the faulty mixer, causing fault diffusion.

According to the method shown in this embodiment, because the mixer policy may be configured on the communication proxy of the data plane, pressure on resources of the mixer that are used to execute the policy configured on the communication proxy is relieved, and consumption of mixer resources is reduced. In addition, because the mixer policy is configured on the communication proxy, the communication proxy may perform at least some policies of the mixer based on the configuration, such as a routing rule policy. In this way, the communication proxy may implement communication between the communication proxy and the back-end infrastructure and communication between different communication proxies without using the mixer. This reduces traffic of the microservice request sent by the communication proxy to the mixer, reduces impact of a burst of microservice requests sent by the communication proxy to the mixer on the mixer, and effectively avoids service interruption.

Figure 9:
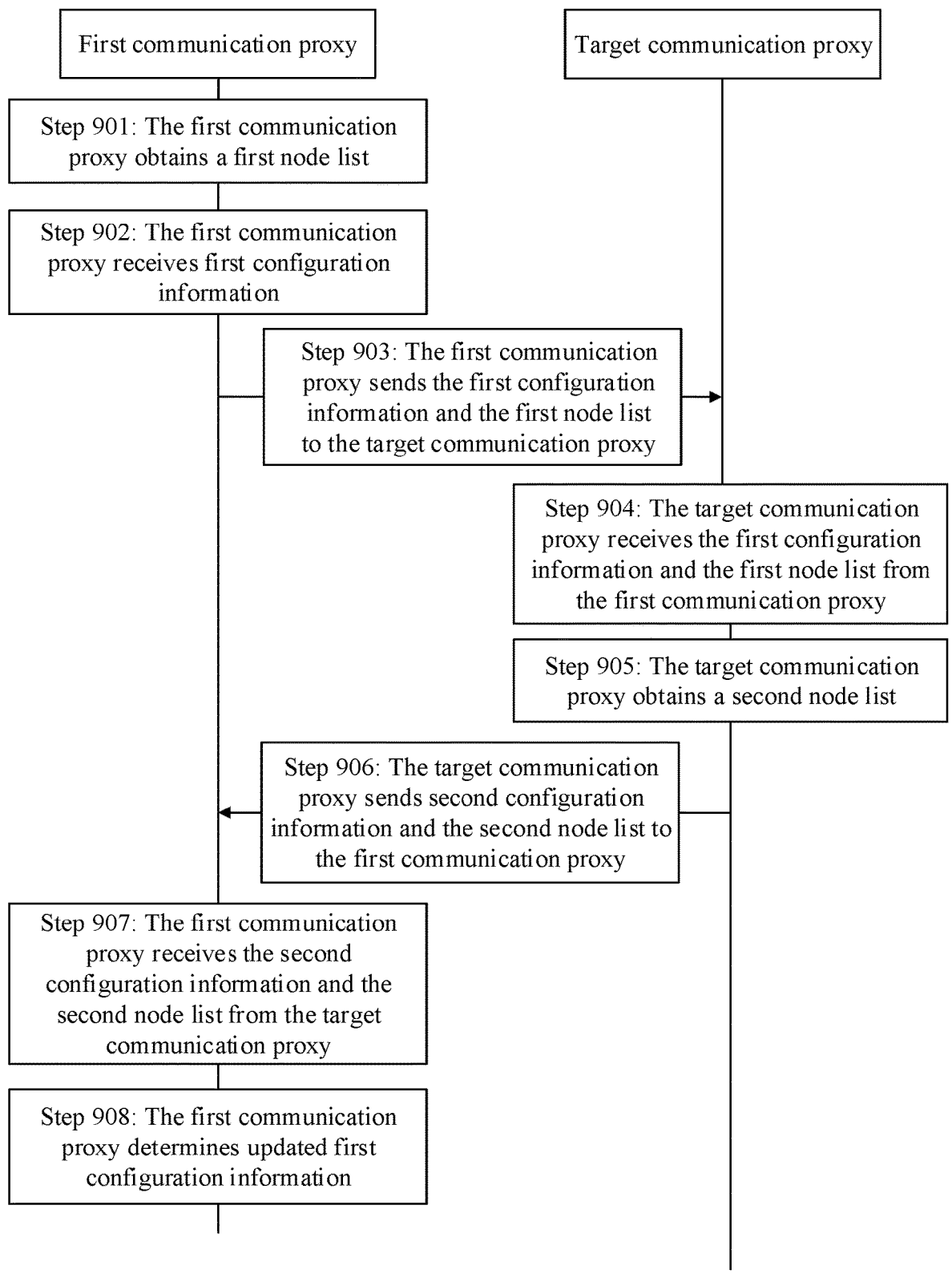
FIG. 9 is a flowchart of steps of another embodiment of a decentralization processing method according to an embodiment of the present invention.

With reference to FIG. 9, the following describes a process of how to implement global consistency in a service mesh when a new communication proxy is added to the service mesh or a communication proxy exits the service mesh. The global consistency means that target correspondences stored in all communication proxies in the service mesh are the same. The target correspondence is a correspondence between an identifier of each communication proxy in all communication proxies in the service mesh and a control plane rule.

Step 901: A first communication proxy obtains a first node list.

Specifically, if a service registration and discovery policy is configured on the first communication proxy shown in this embodiment, the first communication proxy may directly obtain the first node list from a registry server by using the service registration and discovery policy. If the service registration and discovery policy is not configured on the first communication proxy shown in this embodiment, and the service registration and discovery policy is retained in a pilot, the pilot synchronizes the first node list with the registry server, and sends an obtained first node list to the first communication proxy. The first node list includes identifiers of all communication proxies included in the service mesh at a first moment and a control plane rule corresponding to an identifier of each communication proxy.

Specifically, the communication proxies in the service mesh are in a dynamic state. That is, a new communication proxy usually registers with the registry server, and an old communication proxy usually exits the service mesh. The exiting communication proxy may send exit indication information to the registry server. The registry server may delete, based on the exit indication information, the communication proxy indicated by the exit indication information and a control plane rule corresponding to the communication proxy from the node list maintained by the registry server.

It may be learned that, when different communication proxies obtain the node list from the registry server at different moments, different communication proxies may obtain different node lists because a new communication proxy may be added or an old communication proxy may exit.

The first node list obtained by the first communication proxy shown in this embodiment is the identifiers of all communication proxies that are included in the service mesh and that are determined by the registry server at the first moment and the control plane rule corresponding to the identifier of each communication proxy. For a specific description of the control plane rule, refer to the embodiment shown in FIG. 5. Details are not described in this embodiment.

Step 902: The first communication proxy receives first configuration information.

For a specific execution process of step 902 shown in this embodiment, refer to step 501 shown in FIG. 5. The specific execution process is not described in this embodiment.

A sequence of performing step 901 and step 902 is not limited in this embodiment.

Step 903: The first communication proxy sends the first configuration information and the first node list to a target communication proxy.

When the first communication proxy obtains the first configuration and the first node list, the first communication proxy may randomly select a target communication proxy from the first node list, and an identifier of the target communication proxy is located in the first node list. In the service mesh, the target communication proxy is any communication proxy that is different from the first communication proxy.

Then, the first communication proxy sends the first configuration information and the first node list to the selected target communication proxy. When the first communication proxy successfully sends the first configuration information and the first node list to the selected target communication proxy, the first communication proxy may randomly select another target communication proxy from the first node list, and then continue to send the first configuration information and the first node list to the target communication proxy, until the first communication proxy sends the first configuration information and the first node list to each target communication proxy included in the first node list.

Optionally, the first communication proxy may alternatively send the first configuration information and the first node list to all target communication proxies included in the first node list at the same time. This is not specifically limited in this embodiment. In this embodiment, an example in which the first communication proxy sends the first configuration information and the first node list to a randomly selected target communication proxy in the first node list is used for description.

Step 904: The target communication proxy receives the first configuration information and the first node list from the first communication proxy.

Step 905: The target communication proxy obtains a second node list.

For a specific process in which the target communication proxy obtains the second node list shown in this embodiment, refer to the specific process in which the first communication proxy obtains the first node list shown in step 901. Details are not described in this embodiment.

When different communication proxies obtain the node list from the registry server at different moments, different communication proxies may obtain different node lists because a new communication proxy may be added or an old communication proxy may exit. The first node list obtained by the first communication proxy shown in this embodiment is the identifiers of all communication proxies that are included in the service mesh and that are determined by the registry server at the first moment and the control plane rule corresponding to the identifier of each communication proxy. The second node list obtained by the target communication proxy shown in this embodiment is identifiers of all communication proxies that are included in the service mesh and that are determined by the registry server at a second moment and a control plane rule corresponding to an identifier of each communication proxy.

In this embodiment, which is an earlier moment between the first moment and the second moment is not limited. For example, if the first moment is earlier than the second moment, it indicates that a configuration time at which the registry server generates the first node list is earlier than a configuration time at which the registry server generates the second node list. In this case, it indicates that the identifiers of all communication proxies included in the second node list are the same as identifiers of all communication proxies currently included in the service mesh. For another example, if the first moment is later than the second moment, it indicates that the configuration time at which the registry server generates the first node list is later than the configuration time at which the registry server generates the second node list. In this case, it indicates that the identifiers of all communication proxies included in the first node list are the same as identifiers of all communication proxies currently included in the service mesh.

Specifically, for example, if the first moment is earlier than the second moment, the first node list obtained by the first communication proxy includes identifiers of five communication proxies, and the second node list obtained by the target communication proxy includes identifiers of 10 communication proxies, it indicates that after the registry server generates the first node list, five new communication proxies are added to the service mesh, so that the second node list generated by the registry server at the second moment includes identifiers of the five newly added communication proxies.

For another example, if the first moment is earlier than the second moment, the first node list obtained by the first communication proxy includes identifiers of 15 communication proxies, and the second node list obtained by the target communication proxy includes identifiers of five communication proxies, it indicates that after the registry server generates the first node list, 10 communication proxies exit the service mesh, so that identifiers of the 10 communication proxies that have exited are deleted from the second node list generated by the registry server at the second moment.

It should be clarified that, a sequence of performing step 904 and step 905 is not limited in this embodiment.

Step 906: The target communication proxy sends second configuration information and the second node list to the first communication proxy.

Step 907: The first communication proxy receives the second configuration information and the second node list from the target communication proxy.

Step 908: The first communication proxy determines updated first configuration information.

The first communication proxy may update, based on the first configuration information and the first node list that are locally stored in the first communication proxy, and based on second configuration information and second node lists that are sent by all the target communication proxies, the first configuration information stored in the first communication proxy to obtain the updated first configuration information. The updated first configuration information includes a target correspondence, and the target correspondence includes an identifier of each communication proxy included in the service mesh and a control plane rule corresponding to the communication proxy.

According to the method shown in this embodiment, each communication proxy included in the service mesh performs the foregoing process of step 901 to step 908, so that all communication proxies included in the service mesh store the same target correspondence. In this way, the service mesh implements the global consistency.

The following describes an example of a specific process in which the first communication proxy determines the updated first configuration information.

An Optional Update Manner is:

The first communication proxy determines a first target communication proxy based on the first node list and the second node list. The first target communication proxy means that an identifier of the first target communication proxy is set in the first node list, and the identifier of the first target communication proxy is not set in the second node list. In this case, it indicates that for the first communication proxy shown in this embodiment, the first target communication proxy in the service mesh has exited the service mesh. To implement the global consistency of the service mesh, the first communication proxy deletes, from a locally stored target correspondence, a correspondence between the identifier of the first target communication proxy and a control plane rule.

Another Optional Update Manner is:

The first communication proxy determines a second target communication proxy based on the first node list and the second node list. The second target communication proxy means that an identifier of the second target communication proxy is not set in the first node list, and the identifier of the second target communication proxy is set in the second node list. In this case, it indicates that for the first communication proxy shown in this embodiment, a new communication proxy, that is, the second target communication proxy, is added to the service mesh in which the first communication proxy is located. To implement the global consistency of the service mesh, the first communication proxy adds a correspondence between the identifier of the second target communication proxy and a control plane rule to a locally stored target correspondence.

Another Optional Update Manner is:

The first communication proxy determines a third target communication proxy based on the first node list and the second node list. The third target communication proxy shown in this embodiment means that both the first node list and the second node list include an identifier of the third target communication proxy. In this case, it indicates that both a target correspondence stored in the first communication proxy and a target correspondence stored in the target communication proxy include a correspondence between the identifier of the third target communication proxy and a control plane rule.

In this example, the first communication proxy determines whether a version identifier of a first correspondence is later than a version identifier of a second correspondence. The first correspondence is a correspondence that is between the identifier of the third target communication proxy and a control plane rule and that is included in the first configuration information, and the second correspondence is a correspondence that is between the identifier of the third target communication proxy and a control plane rule and that is included in the second configuration information.

Specifically, the version identifier may be a value such as a version number and a version timestamp. In this case, the first communication proxy may determine whether a timestamp and/or a version number included in the first correspondence are/is later than a timestamp and/or a version number included in the second correspondence. If yes, the first communication proxy determines that the version identifier of the first correspondence is later than the version identifier of the second correspondence. If no, the first communication proxy determines that the version identifier of the second correspondence is later than the version identifier of the first correspondence.

If the first communication proxy determines that the version identifier of the first correspondence is later than the version identifier of the second correspondence, the first communication proxy determines that the updated first configuration information includes the first correspondence.

If the first communication proxy determines that the version identifier of the second correspondence is later than the version identifier of the first correspondence, the first communication proxy deletes the first correspondence originally stored in the first configuration information, and sets the second correspondence in the first configuration information to form the updated first configuration information, so that the updated first configuration information includes the second correspondence.

In this embodiment, if the first configuration information is used to indicate at least one control plane rule, and the second configuration information is used to indicate that no control plane rule is configured on the target communication proxy, in this example, the first configuration information is later than the second configuration information, and the communication proxy keeps a policy indicated by the first configuration information unchanged.

As shown in step 903, it may be learned that, a target communication proxy randomly selected by the first communication proxy from the first node list is used as an example in this embodiment. After the target correspondence included in the updated first configuration information locally stored in the first communication proxy is updated for the randomly selected target communication proxy by performing step 903 to step 908, the first communication proxy may return to step 903, randomly select another target communication proxy, and send the updated first configuration information to the selected target communication proxy, to perform an update process of the first configuration information until target correspondences stored in all communication proxies in the service mesh are the same, thereby implementing the global consistency of the service mesh. For a specific update process, refer to step 903 to step 908, and a specific execution process is not described.

In this embodiment, configuration information and a node list transmitted between different communication proxies in the service mesh may be exchanged by using a decentralized network protocol. A specific protocol type of the decentralized network protocol is not limited in this embodiment, provided that the configuration information and the node list may be successfully exchanged between different communication proxies. This embodiment is described by using an example in which the decentralized network protocol is a gossip protocol (gossip protocol).

In this embodiment, a beneficial effect of using the gossip protocol to exchange the configuration information and the node list between different communication proxies is that arbitrary addition and reduction of communication proxies may be allowed in the service mesh. A final state of a target correspondence stored in a newly added communication proxy is consistent with the target correspondence stored in each communication proxy in the service mesh, so that the service mesh has scalability. Breakdown and restart of a host in which any communication proxy in the service mesh is located do not affect information transmission, so that the service mesh has some fault tolerance. The gossip protocol does not require any communication proxy that performs a management function in the service mesh. That is, different communication proxies are equivalent. Any communication proxy in the service mesh does not need to know an entire network status of the entire service mesh, and provided that different communication proxies are connected to each other, any communication proxy in the service mesh may spread configuration information and a node list to each communication proxy in the service mesh, thereby having an advantage of decentralization. In addition, the configuration information and the node list that are transmitted by using the gossip protocol are rapidly propagated in the service mesh at an exponential speed of one to ten and ten to a hundred. Therefore, inconsistency of target correspondences stored in different communication proxies may converge to consistency in a short time, thereby improving efficiency of implementing the global consistency of the service mesh.

According to the method shown in this embodiment, because the control plane rule may be configured on the communication proxy of the data plane, decoupling between the control plane and the data plane is implemented, pressure on resources of the control plane that are used to execute the control plane rule configured on the communication proxy is relieved, and consumption of control plane resources is reduced. In addition, because a function of the control plane is configured on the communication proxy, the communication proxy may execute the control plane rule based on the configuration. This reduces traffic sent by the communication proxy to the control plane, reduces impact of a burst of the traffic sent by the communication proxy to the control plane on the control plane, and effectively avoids service interruption. The service mesh is not suspended due to high traffic on the data plane. In addition, service provisioning and operation and maintenance are effectively prevented from being affected by diffusion of an unknown fault (such as a silent fault) on the control plane in the service mesh.

In addition, according to the method shown in this embodiment, when a policy related to a function of the control plane is configured in the service mesh, only one communication proxy may be randomly selected in the service mesh, and after the policy is configured on the communication proxy based on the first configuration information, the communication proxy exchanges configuration information and a node list with a target communication proxy, to implement the global consistency of the service mesh, thereby improving efficiency of the policy configuration for the communication proxy.

Figure 10:
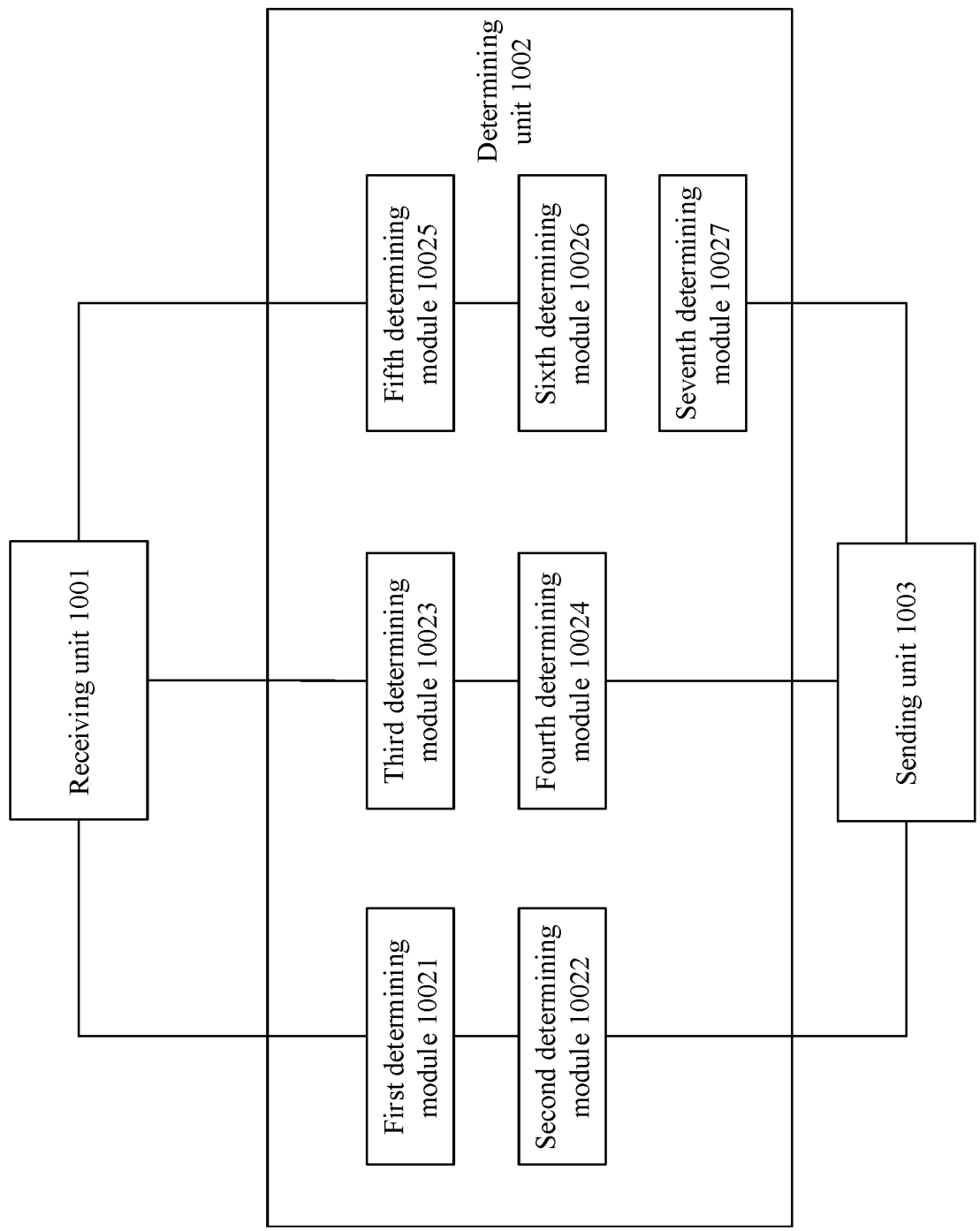
FIG. 10 is a schematic diagram of a structure of an embodiment of a communication proxy according to an embodiment of the present invention.

Based on FIG. 10, the following describes an example of a specific structure of a communication proxy provided in this embodiment. The communication proxy shown in FIG. 10 is configured to perform the decentralization processing method shown in the foregoing embodiment, and in a process of performing the decentralization processing method shown in the foregoing embodiment, the communication proxy is used as a first communication proxy to perform the decentralization processing method. For descriptions of a specific execution process and a beneficial effect, refer to the foregoing embodiment. Details are not described in this embodiment.

As shown in FIG. 10, the communication proxy includes:

a receiving unit 1001, configured to receive a first microservice request sent by a first microservice application, where the first microservice application is a microservice application corresponding to the first communication proxy;

a determining unit 1002, configured to determine, based on a target control plane rule, a microservice access address corresponding to the first microservice request, where the target control plane rule includes a routing rule policy, and the routing rule policy includes a correspondence between the first microservice request and the microservice access address; the microservice access address is an address of a second communication proxy, the second communication proxy corresponds to a second microservice application, and a microservice service supported by the second microservice application is the same as a microservice service requested by the first microservice request; and a sending unit 1003, configured to send the first microservice request to the second communication proxy having the microservice access address, where the second communication proxy is used to forward the first microservice request to the second microservice application.

Optionally, there are a plurality of first microservice requests and a plurality of microservice access addresses, the target control plane rule further includes a traffic splitting policy corresponding to the first microservice requests, and the traffic splitting policy is used to indicate a proportion of first microservice requests to be sent to each microservice access address.

The sending unit 1003 is specifically configured to send the plurality of first microservice requests to each microservice access address based on the traffic splitting policy.

Optionally, there are a plurality of microservice access addresses corresponding to the same first microservice request, and the target control plane rule further includes a load balancing policy corresponding to the first microservice request.

The sending unit 1003 is specifically configured to determine a target microservice access address from the plurality of microservice access addresses based on the load balancing policy, and send the first microservice request to the second communication proxy having the target microservice access address.

Optionally, the target control plane rule further includes preset response duration.

The sending unit 1003 is further configured to: if determining a condition that a successful response message sent by the second communication proxy is not received within the preset response duration, send the first microservice request to a third communication proxy, where the successful response message is used to indicate that the second communication proxy successfully receives the first microservice request, the third communication proxy is used to forward the first microservice request to a third microservice application corresponding to the third communication proxy, and a microservice service supported by the third microservice application is the same as the microservice service requested by the first microservice request.

Optionally, the target control plane rule further includes a data reporting policy corresponding to the first microservice request, and the data reporting policy is used to connect to a back-end infrastructure.

The sending unit 1003 is further configured to send the first microservice request to the back-end infrastructure based on the data reporting policy, where the back-end infrastructure is used to monitor the received first microservice request.

Optionally, the receiving unit 1001 is further configured to receive a second microservice request, where a microservice service requested by the second microservice request is the same as a microservice service supported by the first microservice application.

The sending unit 1003 is further configured to: if determining a condition that verification information included in the second microservice request is the same as preset verification information, forward the second microservice request to the first microservice application.

Optionally, the target control plane rule further includes a quota management policy corresponding to the second microservice request, and the quota management policy is used to indicate a preset connection quantity.

The sending unit 1003 is further configured to: obtain a target connection quantity, where the target connection quantity is a quantity of second microservice requests currently being processed by the first microservice application; and if determining a condition that the target connection quantity is less than the preset connection quantity, send the second microservice request to the first microservice application.

Optionally, the receiving unit 1001 is further configured to obtain first configuration information stored in the first communication proxy.

The receiving unit 1001 is further configured to receive second configuration information sent by at least one target communication proxy, where the target communication proxy is a communication proxy that is in a microservice system and that is different from the first communication proxy, and at least one of the first configuration information and the at least one piece of second configuration information includes a correspondence between an identifier of the first communication proxy and a control plane rule.

The determining unit 1002 is further configured to determine the target control plane rule based on the first configuration information and the at least one piece of second configuration information, where the target control plane rule is a control plane rule corresponding to the identifier of the first communication proxy.

Optionally, the receiving unit 1001 is further configured to obtain a stored first node list.

The receiving unit 1001 is further configured to receive a second node list from the at least one target communication proxy, where at least one of the first node list and the at least one second node list includes an identifier of each communication proxy in the microservice system.

The determining unit 1002 is further configured to determine updated first configuration information based on the first node list and the second node list, where the updated first configuration information includes a correspondence between the identifier of each communication proxy in the microservice system and a control plane rule.

Optionally, the determining unit 1002 includes:

a first determining module 10021, configured to determine a first target communication proxy, where the first node list includes an identifier of the first target communication proxy, and the second node list does not include the identifier of the first target communication proxy; and a second determining module 10022, configured to determine the updated first configuration information based on the first target communication proxy, where the updated first configuration information is information generated after a correspondence between the identifier of the first target communication proxy and a control plane rule is deleted from the first configuration information.

Optionally, the determining unit 1002 includes:

a third determining module 10023, configured to determine a second target communication proxy, where the first node list does not include an identifier of the second target communication proxy, and the second node list includes the identifier of the first target communication proxy; and a fourth determining module 10024, configured to determine the updated first configuration information based on the second target communication proxy, where the updated first configuration information is information generated after a correspondence between the identifier of the second target communication proxy and a control plane rule is added to the first configuration information.

Optionally, the determining unit 1002 includes:

a fifth determining module 10025, configured to determine a third target communication proxy, where both the first node list and the second node list include an identifier of the third target communication proxy;

a sixth determining module 10026, configured to: if determining a condition that a version identifier of a first correspondence is later than a version identifier of a second correspondence, determine that the updated first configuration information includes the first correspondence, where the first correspondence is a correspondence that is between the identifier of the third target communication proxy and a control plane rule and that is included in the first configuration information, and the second correspondence is a correspondence that is between the identifier of the third target communication proxy and a control plane rule and that is included in the second configuration information; and a seventh determining module 10027, configured to: if determining a condition that the version identifier of the second correspondence is later than the version identifier of the first correspondence, determine that the updated first configuration information includes the second correspondence.

Figure 11:
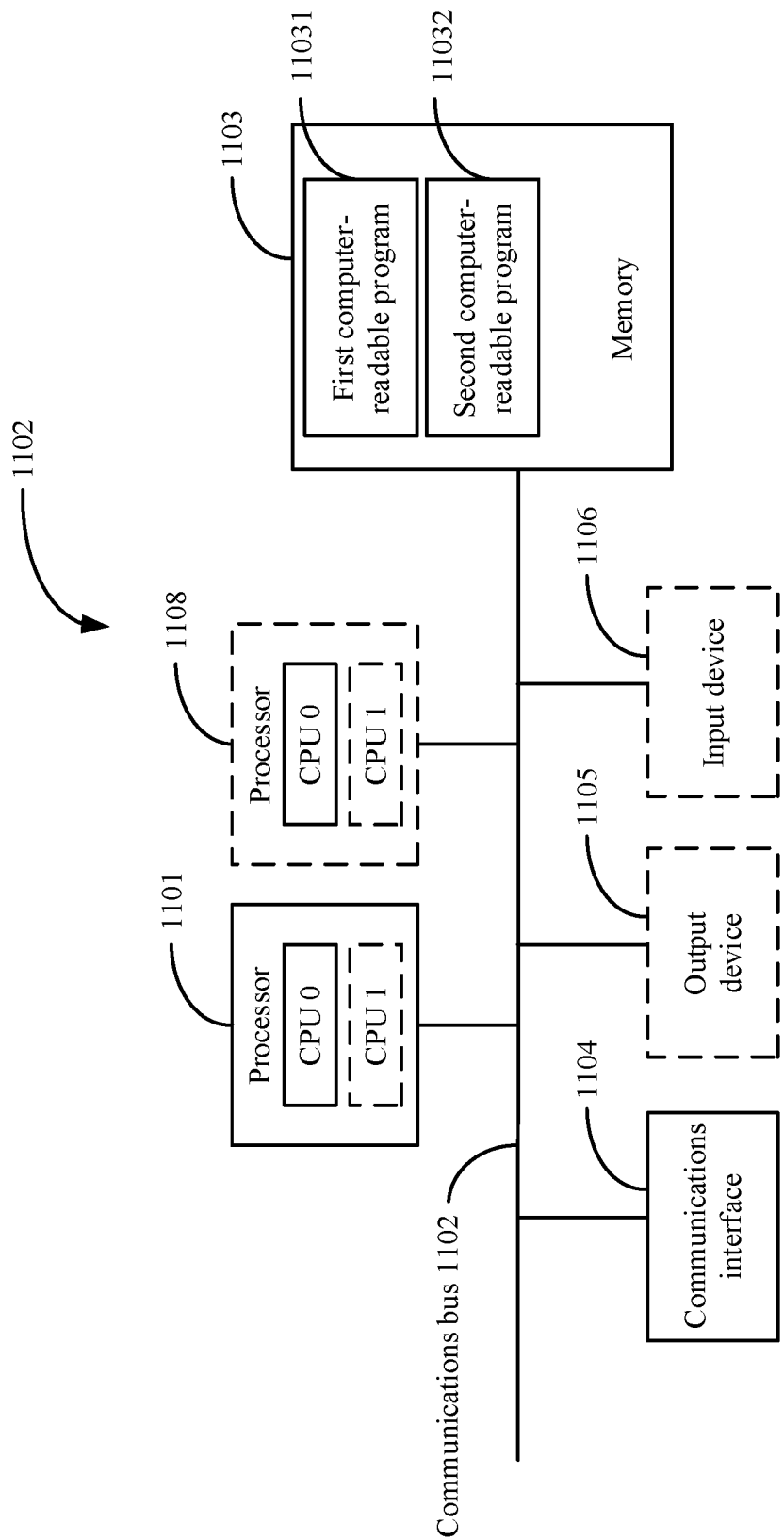
FIG. 11 is a schematic diagram of a structure of an embodiment of a host according to an embodiment of the present invention.

With reference to FIG. 11, the following describes an example of a specific structure of a host shown in this embodiment. The host shown in this embodiment is configured to perform the decentralization processing method shown in the foregoing embodiment. For a specific execution process, refer to the foregoing embodiment. Details are not described in this embodiment. The host may carry a plurality of microservice applications and communication proxies.

FIG. 11 shows a computer hardware structure for performing a function of a host 1102 in the present invention. The host 1102 includes at least one processor 1101, a communications bus 1102, a memory 1103, and at least one communications interface 1104.

The processor 1101 may be a general-purpose central processing unit (CPU), a microprocessor, an application-specific integrated circuit (ASIC), or one or more integrated circuits for controlling program execution of the solutions of the present invention.

The communications bus 1102 may include a path for transferring information between the foregoing components.

The communications interface 1104 is any apparatus of a transceiver type, and is configured to communicate with another device or a communications network, for example, the Ethernet, a radio access network (RAN), or a wireless local area network (WLAN).

The memory 1103 may be a read-only memory (ROM) or another type of static storage device capable of storing static information and instructions, or a random access memory (RAM) or another type of dynamic storage device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile optical disc, a blu-ray optical disc, or the like), a magnetic disk storage medium or another magnetic storage device, or any other medium capable of carrying or storing expected program code in a form of instructions or data structures and capable of being accessed by a computer, but is not limited thereto. The memory may exist independently, and is connected to the processor through the bus. Alternatively, the memory may be integrated with the processor.

The memory 1103 is configured to store a first computer-readable program 11031 and a second computer-readable program 11032. When the processor 1101 executes the first computer-readable program 11031, the processor 1101 is configured to perform a related function of a microservice application used to provide a microservice service. When the processor 1101 executes the second computer-readable program 11032, the processor 1101 is configured to perform a related function of the communication proxy shown in the foregoing embodiment. For a specific execution process, refer to the foregoing embodiment. Details are not described in this embodiment.

During specific embodiments of an implementation, in an embodiment, the processor 1101 may include one or more CPUs, for example, a CPU 0 and a CPU 1 in FIG. 11.

During specific embodiments of an implementation, in an embodiment, the host 1102 may include a plurality of processors such as the processor 1101 and a processor 1108 in FIG. 11. Each of the processors may be a single-core (e.g., single-CPU) processor, or may be a multi-core (e.g., multi-CPU) processor. The processor herein may be one or more devices, circuits, and/or processing cores configured to process data (for example, computer program instructions).

During specific embodiments of an implementation, in an embodiment, the host 1102 may further include an output device 1105 and an input device 1106. The output device 1105 communicates with the processor 1101, and may display information in a plurality of manners. The host 1102 may be a general-purpose computer device or a dedicated computer device.

It may be clearly understood by a person skilled in the art that, for ease and brevity of description, for detailed working processes of the foregoing system, apparatus, and unit, refer to a corresponding process in the foregoing method embodiments, and details are not described herein again.

In the several embodiments provided in this application, it should be understood that the disclosed system, apparatus, and method may be implemented in another manner. For example, the foregoing described apparatus embodiments are merely examples. For example, division into the units is merely logical function division, and there may be another division manner during actual implementation. For example, a plurality of units or components may be combined or integrated into another system, or some features may be ignored or may not be performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units; in other words, may be located in one location, or may be distributed on a plurality of network units. Some or all of the units may be selected based on an actual requirement to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present invention. The foregoing storage medium includes: any medium that can store program code, such as a universal serial bus (USB) flash drive, a removable hard disk, a read-only memory (ROM), a random access memory (RAM), a magnetic disk, or an optical disc.

The foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A decentralization processing method, comprising:
    receiving, by a first communication proxy in a microservice system, a first microservice request sent by a first microservice application, wherein the first microservice application is a microservice application corresponding to the first communication proxy;
    determining, by the first communication proxy based on a target control plane rule, a microservice access address corresponding to the first microservice request, wherein the target control plane rule comprises a routing rule policy, and the routing rule policy comprises a correspondence between the first microservice request and the microservice access address; the microservice access address is an address of a second communication proxy that corresponds to a second microservice application, and a microservice service supported by the second microservice application is the same as a microservice service requested by the first microservice request; and
    sending, by the first communication proxy, the first microservice request to the second communication proxy having the microservice access address, wherein the second communication proxy forwards the first microservice request to the second microservice application.

2. The method according to claim 1, wherein there are a plurality of first microservice requests and a plurality of microservice access addresses, the target control plane rule further comprises a traffic splitting policy corresponding to the plurality of first microservice requests, and the traffic splitting policy indicates a proportion of first microservice requests to be sent to each microservice access address; and
    the sending, by the first communication proxy, the first microservice request to the second communication proxy having the microservice access address comprises:
    sending, by the first communication proxy, the plurality of first microservice requests to each microservice access address based on the traffic splitting policy.

3. The method according to claim 1, wherein there are a plurality of microservice access addresses corresponding to the same first microservice request, and the target control plane rule further comprises a load balancing policy corresponding to the first microservice request; and
    the sending, by the first communication proxy, the first microservice request to the second communication proxy having the microservice access address comprises:
    determining, by the first communication proxy, a target microservice access address from the plurality of microservice access addresses based on the load balancing policy, and sending the first microservice request to the second communication proxy having the target microservice access address.

4. The method according to claim 1, wherein the target control plane rule further comprises preset response duration; and
    after the sending, by the first communication proxy, the first microservice request to the second communication proxy having the microservice access address, the method further comprises:
    when the first communication proxy determines a condition that a successful response message sent by the second communication proxy is not received within the preset response duration, sending the first microservice request to a third communication proxy, wherein the successful response message indicates that the second communication proxy successfully receives the first microservice request, the third communication proxy forwards the first microservice request to a third microservice application corresponding to the third communication proxy, and a microservice service supported by the third microservice application is the same as the microservice service requested by the first microservice request.

5. The method according to claim 1, wherein the target control plane rule further comprises a data reporting policy corresponding to the first microservice request, and the data reporting policy connects to a back-end infrastructure; and
    after the first communication proxy receives the first microservice request sent by the first microservice application, the method further comprises:
    sending, by the first communication proxy, the first microservice request to the back-end infrastructure based on the data reporting policy, wherein the back-end infrastructure monitors the received first microservice request.

6. The method according to claim 1, wherein the method further comprises:
    receiving, by the first communication proxy, a second microservice request, wherein a microservice service requested by the second microservice request is the same as a microservice service supported by the first microservice application; and when the first communication proxy determines a condition that verification information comprised in the second microservice request is the same as preset verification information, forwarding the second microservice request to the first microservice application.

7. The method according to claim 6, wherein the target control plane rule further comprises a quota management policy corresponding to the second microservice request, and the quota management policy indicates a preset connection quantity; and the forwarding, by the first communication proxy, the second microservice request to the first microservice application comprises:

obtaining, by the first communication proxy, a target connection quantity that is a quantity of second microservice requests currently being processed by the first microservice application; and when the first communication proxy determines a condition that the target connection quantity is less than the preset connection quantity, sending the second microservice request to the first microservice application.

8. The method according to claim 1, wherein the method further comprises:

obtaining, by the first communication proxy, first configuration information stored in the first communication proxy;

receiving, by the first communication proxy, second configuration information sent by at least one target communication proxy, wherein the at least one target communication proxy is a communication proxy that is in the microservice system and that is different from the first communication proxy, and at least one of the first configuration information and at least one piece of the second configuration information comprises a correspondence between an identifier of the first communication proxy and a control plane rule; and determining, by the first communication proxy, the target control plane rule based on the first configuration information and the at least one piece of the second configuration information, wherein the target control plane rule is a control plane rule corresponding to the identifier of the first communication proxy.

9. The method according to claim 8, wherein the method further comprises:

obtaining, by the first communication proxy, a first node list stored by the first communication proxy;

receiving, by the first communication proxy, a second node list from the at least one target communication proxy, wherein at least one of the first node list and the at least one second node list comprises an identifier of each communication proxy in the microservice system; and determining, by the first communication proxy, updated first configuration information based on the first node list and the second node list, wherein the updated first configuration information comprises a correspondence between the identifier of each communication proxy in the microservice system and a control plane rule.

10. The method according to claim 9, wherein the determining, by the first communication proxy, updated first configuration information based on the first node list and the second node list comprises:

determining, by the first communication proxy, a first target communication proxy, wherein the first node list comprises an identifier of the first target communication proxy, and the second node list does not comprise the identifier of the first target communication proxy; and determining, by the first communication proxy, the updated first configuration information based on the first target communication proxy, wherein the updated first configuration information is information generated after a correspondence between the identifier of the first target communication proxy and a control plane rule is deleted from the first configuration information.

11. A host, comprising:

a memory storing a first computer-readable program and a second computer-readable program; and a processor, coupled with the memory, running the first computer-readable program in the memory, to perform a function of a microservice application for providing a microservice service, and the processor running the second computer-readable program in the memory, to perform:

receiving, by a first communication proxy in a microservice system, a first microservice request sent by a first microservice application, wherein the first microservice application is a microservice application corresponding to the first communication proxy;

determining, by the first communication proxy based on a target control plane rule, a microservice access address corresponding to the first microservice request, wherein the target control plane rule comprises a routing rule policy, and the routing rule policy comprises a correspondence between the first microservice request and the microservice access address; the microservice access address is an address of a second communication proxy that corresponds to a second microservice application, and a microservice service supported by the second microservice application is the same as a microservice service requested by the first microservice request; and sending, by the first communication proxy, the first microservice request to the second communication proxy having the microservice access address, wherein the second communication proxy forwards the first microservice request to the second microservice application.

12. The host according to claim 11, wherein there are a plurality of first microservice requests and a plurality of microservice access addresses, the target control plane rule further comprises a traffic splitting policy corresponding to the plurality of first microservice requests, and the traffic splitting policy indicates a proportion of first microservice requests to be sent to each microservice access address; and the sending, by the first communication proxy, the first microservice request to the second communication proxy having the microservice access address comprises:

sending, by the first communication proxy, the plurality of first microservice requests to each microservice access address based on the traffic splitting policy.

13. The host according to claim 11, wherein there are a plurality of microservice access addresses corresponding to the same first microservice request, and the target control plane rule further comprises a load balancing policy corresponding to the first microservice request; and the sending, by the first communication proxy, the first microservice request to the second communication proxy having the microservice access address comprises:

determining, by the first communication proxy, a target microservice access address from the plurality of microservice access addresses based on the load balancing policy, and sending the first microservice request to the second communication proxy having the target microservice access address.

14. A non-transitory computer-readable storage medium, wherein the computer-readable storage medium stores instructions, which when executed by at least one processor of a processing system, causes the at least one processor to perform a method, comprising:

receiving, by a first communication proxy in a microservice system, a first microservice request sent by a first microservice application, wherein the first microservice application is a microservice application corresponding to the first communication proxy;

determining, by the first communication proxy based on a target control plane rule, a microservice access address corresponding to the first microservice request, wherein the target control plane rule comprises a routing rule policy, and the routing rule policy comprises a correspondence between the first microservice request and the microservice access address; the microservice access address is an address of a second communication proxy that corresponds to a second microservice application, and a microservice service supported by the second microservice application is the same as a microservice service requested by the first microservice request; and sending, by the first communication proxy, the first microservice request to the second communication proxy having the microservice access address, wherein the second communication proxy forwards the first microservice request to the second microservice application.

15. The non-transitory computer-readable medium according to claim 14, wherein there are a plurality of first microservice requests and a plurality of microservice access addresses, the target control plane rule further comprises a traffic splitting policy corresponding to the plurality of first microservice requests, and the traffic splitting policy indicates a proportion of first microservice requests to be sent to each microservice access address; and the sending, by the first communication proxy, the first microservice request to the second communication proxy having the microservice access address comprises:

sending, by the first communication proxy, the plurality of first microservice requests to each microservice access address based on the traffic splitting policy.

16. The non-transitory computer-readable medium according to claim 14, wherein there are a plurality of microservice access addresses corresponding to the same first microservice request, and the target control plane rule further comprises a load balancing policy corresponding to the first microservice request; and the sending, by the first communication proxy, the first microservice request to the second communication proxy having the microservice access address comprises:

determining, by the first communication proxy, a target microservice access address from the plurality of microservice access addresses based on the load balancing policy, and sending the first microservice request to the second communication proxy having the target microservice access address.

* * * * *